US009990955B2

(12) United States Patent
Nakajima et al.

(10) Patent No.: US 9,990,955 B2
(45) Date of Patent: Jun. 5, 2018

(54) IMAGE RECORDING APPARATUS AND METHOD, AND IMAGE PLAYBACK APPARATUS AND METHOD

(71) Applicant: CANON KABUSHIKI KAISHA, Tokyo (JP)

(72) Inventors: Michinori Nakajima, Kawasaki (JP); Koichi Okada, Kunitachi (JP); Kurumi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/338,508

(22) Filed: Oct. 31, 2016

(65) Prior Publication Data

US 2017/0047091 A1    Feb. 16, 2017

Related U.S. Application Data

(63) Continuation of application No. 14/462,772, filed on Aug. 19, 2014, now Pat. No. 9,544,530.

(30) Foreign Application Priority Data

Aug. 23, 2013    (JP) ................................. 2013-173364
Aug. 23, 2013    (JP) ................................. 2013-173365
Aug. 23, 2013    (JP) ................................. 2013-173778

(51) Int. Cl.
*H04N 5/77*    (2006.01)
*G11B 19/02*    (2006.01)
(Continued)

(52) U.S. Cl.
CPC ............ *G11B 19/022* (2013.01); *G11B 19/02* (2013.01); *G11B 27/031* (2013.01); *G11B 27/28* (2013.01);
(Continued)

(58) Field of Classification Search
CPC ...... H04N 5/772; H04N 5/907; H04N 9/8205; H04N 5/77; H04N 5/23245; G11B 27/031;
(Continued)

(56) References Cited

U.S. PATENT DOCUMENTS 6,256,453 B1 *   7/2001   Takano ................ G11B 27/036
                                                       348/E5.047
2004/0051788 A1   3/2004   Oka et al.
(Continued)

FOREIGN PATENT DOCUMENTS

CN   101540867 A    9/2009
JP   10-143977 A    5/1998
(Continued)

OTHER PUBLICATIONS

The above patent documents were cited in a Jun. 27, 2017 Japanese Office Action, which is enclosed without an English Translation, that issued in Japanese Patent Application No. 2013173365.
(Continued)

*Primary Examiner* — William Tran
(74) *Attorney, Agent, or Firm* — Cowan, Liebowitz & Latman, P.C.

(57) ABSTRACT

An image recording apparatus having an image sensing unit and a particular operation unit controls so as to start or to stop, in a case where the first recording mode is set, in accordance with an operation on the particular operation unit, a recording to a recording medium of a moving image captured by the imaging unit, and to control so as to record, in a case where the second recording mode is set, in accordance with an operation on the particular operation unit, while continuing recording to the recording medium of a moving image captured by the imaging unit, information indicating a start of a scene which is a portion of the moving
(Continued)

image being recorded, or information indicating an end of a scene which is a portion of the moving image being recorded.

13 Claims, 26 Drawing Sheets

(51) Int. Cl.
| | | |
|---|---|---|
| *G11B 27/34* | (2006.01) | |
| *G11B 31/00* | (2006.01) | |
| *H04N 5/907* | (2006.01) | |
| *H04N 9/82* | (2006.01) | |
| *G11B 27/031* | (2006.01) | |
| *G11B 27/32* | (2006.01) | |
| *G11B 27/28* | (2006.01) | |
| *H04N 5/232* | (2006.01) | |

(52) U.S. Cl.
CPC ............ *G11B 27/327* (2013.01); *G11B 27/34* (2013.01); *G11B 31/006* (2013.01); *H04N 5/23245* (2013.01); *H04N 5/77* (2013.01); *H04N 5/772* (2013.01); *H04N 5/907* (2013.01); *H04N 9/8205* (2013.01)

(58) Field of Classification Search
CPC ....... G11B 27/327; G11B 19/02; G11B 27/34; G11B 31/006; G11B 19/022; G11B 27/28
USPC .......................................................... 386/228
See application file for complete search history.

(56) References Cited

U.S. PATENT DOCUMENTS

| | | | |
|---|---|---|---|
| 2007/0223880 | A1 | 9/2007 | Ohtsuki et al. |
| 2008/0107400 | A1 | 5/2008 | Jung |
| 2009/0037524 | A1* | 2/2009 | O'Rourke ............. H04L 63/083 709/203 |
| 2012/0051715 | A1* | 3/2012 | Mori ...................... H04N 5/772 386/230 |
| 2013/0108234 | A1* | 5/2013 | Ishihara ............. G11B 27/3027 386/224 |
| 2014/0178039 | A1* | 6/2014 | Sekiguchi ........... G11B 27/322 386/241 |

FOREIGN PATENT DOCUMENTS

| | | |
|---|---|---|
| JP | 10-188540 A | 7/1998 |
| JP | 10-304234 A | 11/1998 |

OTHER PUBLICATIONS

The above patent documents were cited in a May 3, 2017 Chinese Office Action, which is enclosed with an English Translation, that issued in Chinese Patent Application No. 201410419900.X.
The above patent document was cited in a European Office Action dated Jan. 30, 2017, which is enclosed, that issued in the corresponding European Patent Application No. 15187551.5.

* cited by examiner

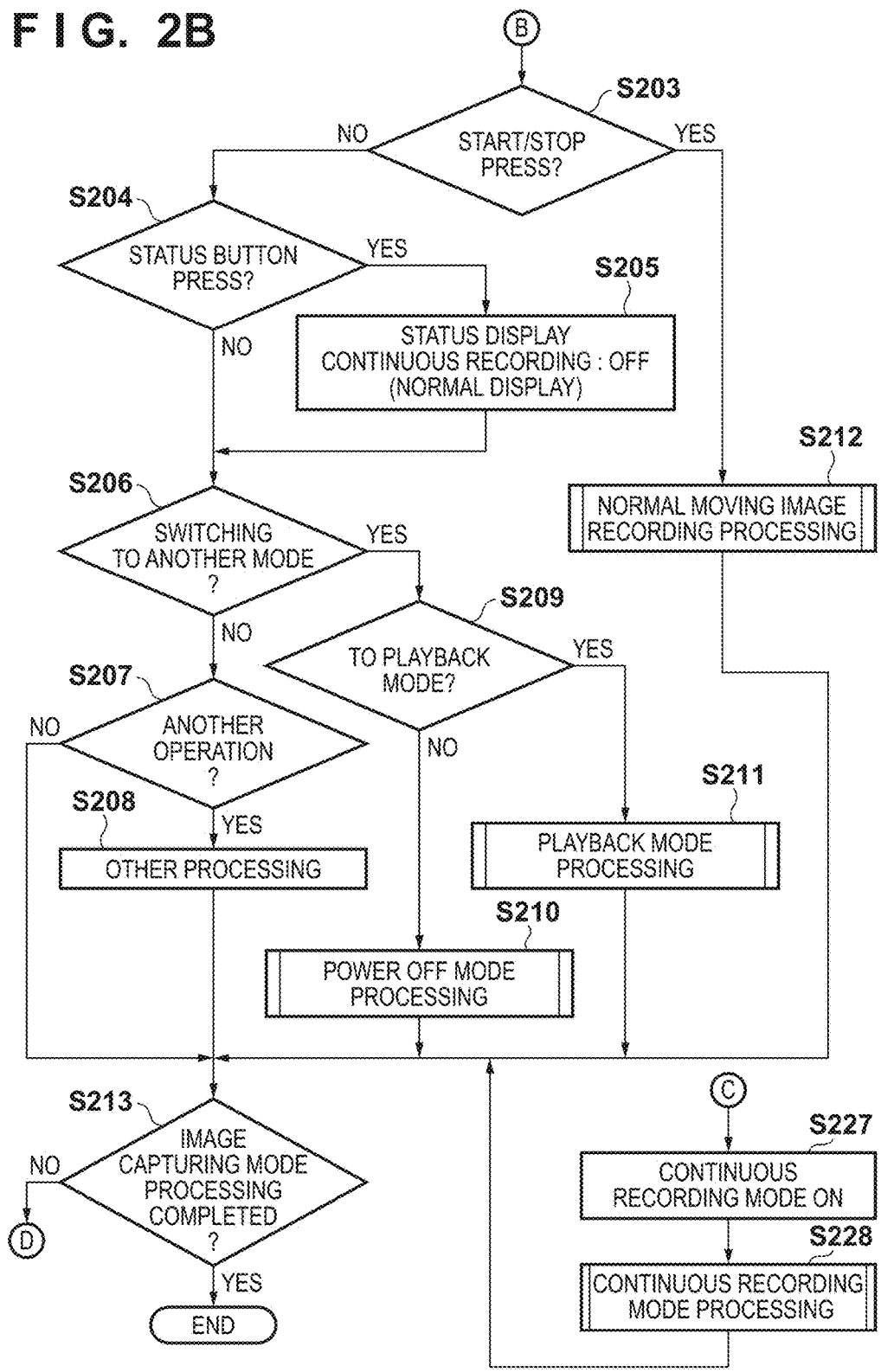

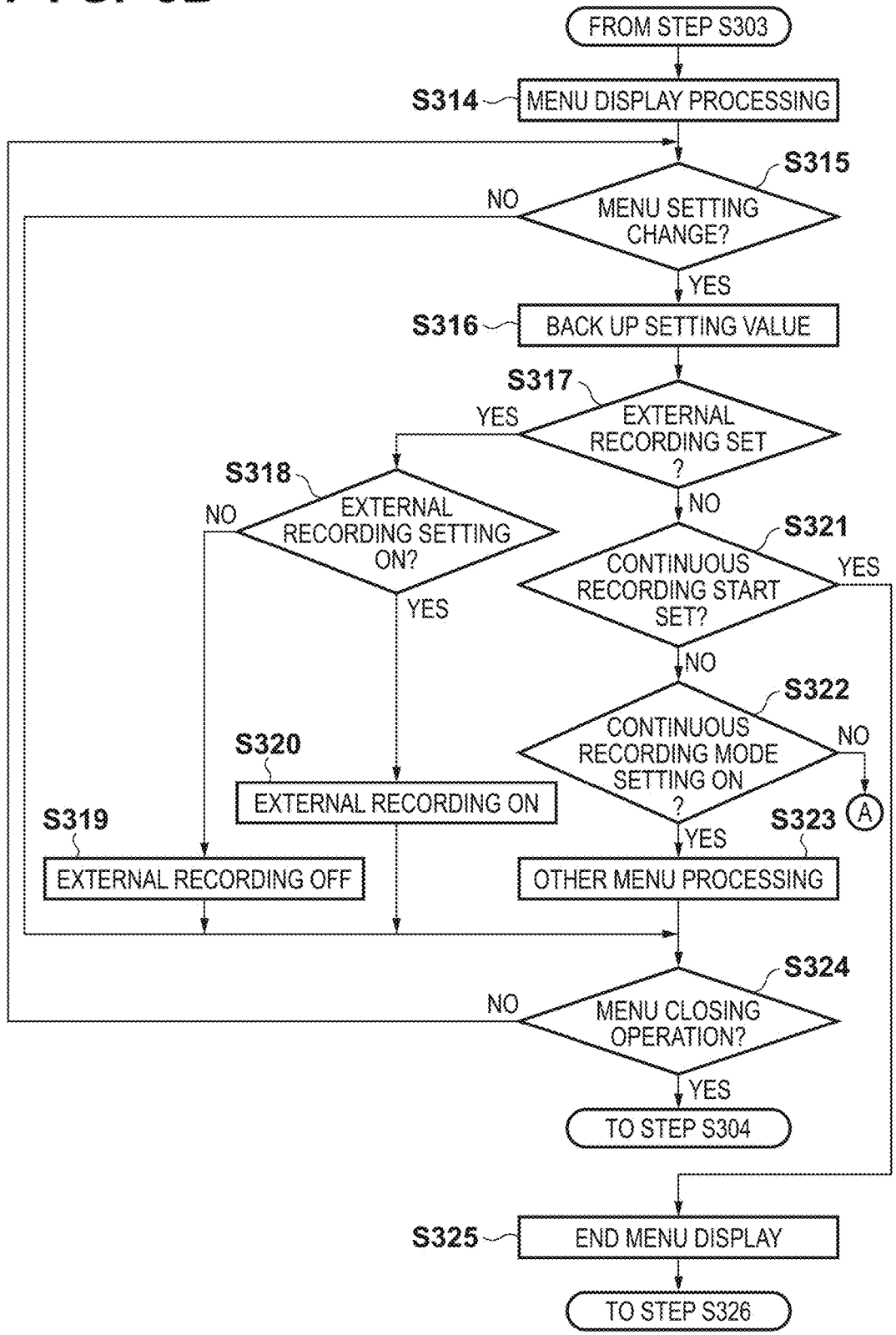

F I G. 8A
801
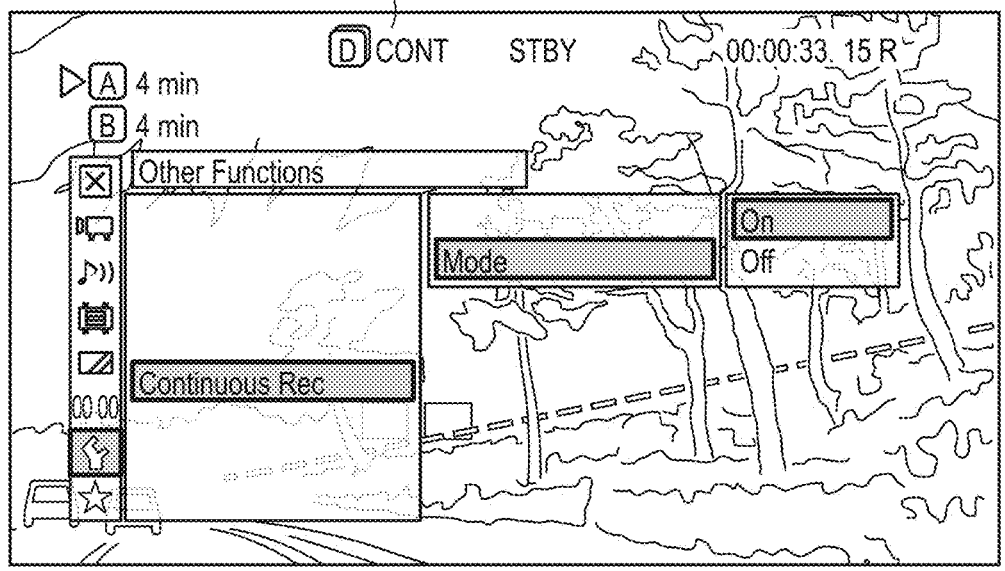
F I G. 8B
802
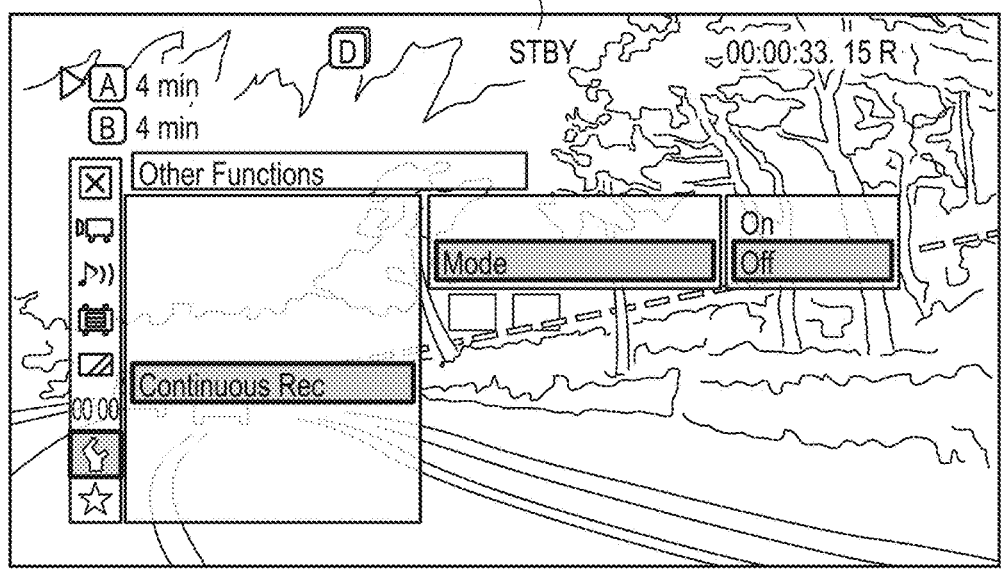

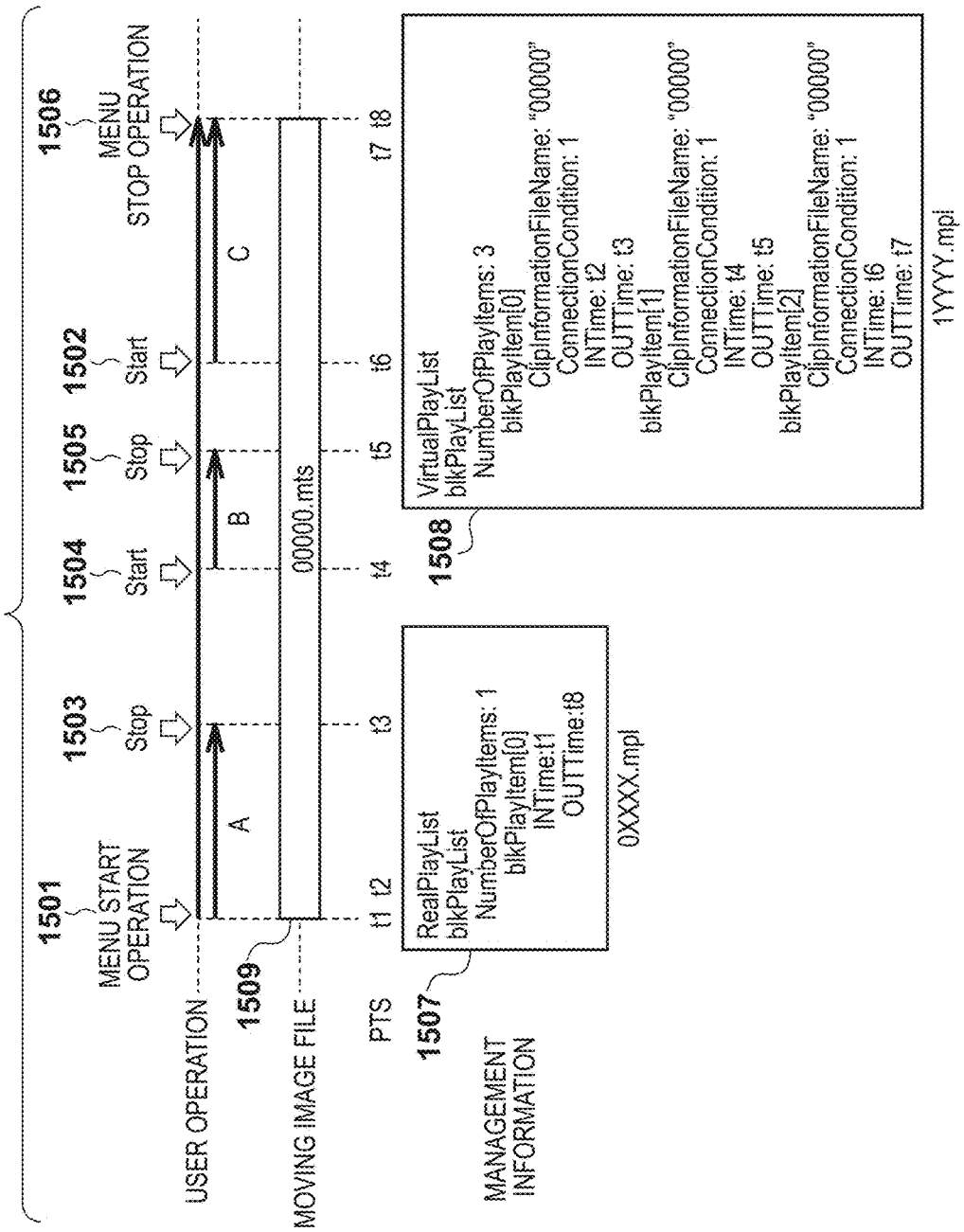

IMAGE RECORDING APPARATUS AND METHOD, AND IMAGE PLAYBACK APPARATUS AND METHOD

CROSS-REFERENCE TO RELATED APPLICATIONS

This application is a continuation of application Ser. No. 14/462,772, filed Aug. 19, 2014 the entire disclosure of which is hereby incorporated by reference.

BACKGROUND OF THE INVENTION

Field of the Invention

The present invention relates to an image recording apparatus and an image recording method for performing a recording of a moving image. Also, the present invention relates to an image playback apparatus and an image playback method for performing a playback of a moving image.

Description of the Related Art

In general, a moving image recording operation by an image recording apparatus as typified by a digital video camera starts with an image capturing start instruction of an operator, and ends with an image capturing end instruction of an operator. However, there are cases in which it cannot be predicted when an important scene will occur, and where the image capturing start instruction of the operator is not in time and the operator fails to capture an important scene.

As a counter-measure to the above problem, continuously recording a moving image can be considered. In Japanese Patent Laid-Open No. 2010-161512, transmitting important scene start information along with a video to an external recording apparatus has been proposed. According to Japanese Patent Laid-Open No. 2010-161512, the external recording apparatus records all of a video as a moving image, but the video is divided based on start information, and the moving image is recorded being divided into a plurality of files. Meanwhile, in Japanese Patent Laid-Open No. 2003-283988, it is recited that a zoom operation unit is used for a trimming operation unit. Japanese Patent Laid-Open No. 2003-283988 realizes an intuitive operation while assigning functions so that the same key has a different role in different operation modes.

Also, in the method that is proposed, metadata is generated for the recorded video, and based on the metadata, playback control is performed. In Japanese Patent Laid-Open No. 2007-174697, video in the vicinity of an in point and an out point, added based on an operation of an operator for a video that is previously recorded, is recorded. An editing list is generated by previewing a recorded video, and correcting the detailed in point/out points. Also, an editing apparatus that performs a playback operation in accordance with the editing list has been proposed. In addition, in Japanese Patent Laid-Open No. 2009-77426, a digital broadcasting recording playback apparatus for performing playback control by generating metadata of in point and out point information based on an event message has been proposed.

There is a problem in that when a moving image is continuously recorded, a large amount of processing time is required for searching for a target scene. Here, recording, as attribute information, an in point and an out point of a scene that a photographer thinks to be important upon image capture by continuous recording to make easier later searching for the important scene can be considered. For doing this, a designating unit for inputting in point/out point information in a case in which continuous recording is performed is necessary.

Meanwhile, in many digital video cameras, configuration is taken such that the above described image capturing start and image capturing end instructions are performed by pressing a START/STOP button on a main body of the image recording apparatus. In other words, when the START/STOP button is pressed, it is recognized as the image capturing start instruction, and when the START/STOP button is pressed once again, it is recognized as the image capturing end Instruction. So, in cases where the photographer intends to make the image capturing start instruction but the image recording apparatus is already in the process of recording a moving image, the recording of the moving image is stopped. Furthermore, in a case where the image recording apparatus was already stopped, recording of a moving image is started when the photographer presses the START/STOP button with the intention of performing the image capturing stop instruction. In this way, situations can occur in which start/stop operations for recording by the photographer do the opposite of what the photographer intends to do.

Also, a duration of a scene between an in point and an out point is useful information to the photographer. However, conventionally, while a duration over which the moving image being recorded is already recorded is displayed, notifying the photographer of the duration of the scene between the in point and the out point is not considered.

In addition, various units for moving images for which usability is good for the user when a moving image recorded by these kinds of imaging methods is played back can be considered. In other words, there are cases where usability is better when viewing a scene between an in point and an out point as the unit of a single moving image, and cases where it is more user-friendly when viewing the moving image from the recording start to the recording end as the unit of a single moving image. In conventional moving image playback approaches, there are cases in which there has not be sufficient consideration for these kinds of usability differences, and the user has had to perform a cumbersome operation in order to perform a playback of a moving image in units that the user desires.

SUMMARY OF THE INVENTION

The present invention was conceived in view of the above described issues.

According to one aspect of the present invention, there is provided an image recording apparatus comprising: an imaging unit; a particular operation unit; a setting unit configured to set one of a plurality of operation modes including a first recording mode and a second recording mode; and a control unit configured to control so as to start or to stop, in a case where the first recording mode is set, in accordance with an operation on the particular operation unit, a recording to a recording medium of a moving image captured by the imaging unit, and to control so as to record, in a case where the second recording mode is set, in accordance with an operation on the particular operation unit, while continuing recording to the recording medium of a moving image captured by the imaging unit information indicating a start of a scene which is a portion of the moving image being recorded, or information indicating an end of a scene which is a portion of the moving image being recorded.

Also, according to another aspect of the present invention, there is provided an image recording method of an image recording apparatus having an imaging unit and a particular operation unit, the method comprising: a setting step of setting one of a plurality of operation modes including a first recording mode and a second recording mode; and control step of controlling so as to start or to stop, in a case where the first recording mode is set, in accordance with an operation on the particular operation unit, a recording to a recording medium of a moving image captured by the imaging unit, and to control so as to record, in a case where the second recording mode is set, in accordance with an operation on the particular operation unit, while continuing recording to the recording medium of a moving image captured by the imaging unit, information indicating a start of a scene which is a portion of the moving image being recorded, or information indicating an end of a scene which is a portion of the moving image being recorded.

Also, according to another aspect of the present invention, there is provided an image recording apparatus comprising: a moving image recording unit configured to controls so that a moving image is recorded on a recording medium; an information recording unit configured to controls so as to, while continuing the recording of the moving image, record information indicating a start and an end of a scene which is a portion of the moving image being recorded in association with the moving image being recorded; and a display control unit configured to control so that, during recording of the moving image by the moving image recording unit, a total time of a plurality of scenes corresponding to the information recorded in association with the moving image being recorded is displayed.

Also, according to another aspect of the present invention, there is provided an image recording method performed by an image recording apparatus, the method comprising: a moving image recording step of controlling so that a moving image is recorded on a recording medium; an information recording step of controlling so as to, while continuing the recording of the moving image, record information indicating a start and an end of a scene which is a portion of the moving image being recorded in association with the moving image being recorded; and a display control step of controlling so that, during recording of the moving image in the moving image recording step, a total time of a plurality of scenes corresponding to the information recorded in association with the moving image being recorded is displayed.

Also, according to another aspect of the present invention, there is provided an image playback apparatus comprising: a moving image recording unit configured to control so that a moving image is recorded on a recording medium; an information recording unit configured to control so as to, while continuing the recording of the moving image, record information indicating a start of a scene which is a portion of the moving image being recorded and information indicating an end of the scene which is the portion of the moving image being recorded in association with the moving image being recorded; a setting unit configured to set a recording mode from out of a plurality recording modes including a first recording mode in which a recording of the information is not performed by the information recording unit during recording of a moving image by the moving image recording unit, and a second recording mode in which a recording of the information can be performed by the information recording unit during recording of a moving image by the moving image recording unit; a switch unit configured to switch between a recording mode and a playback mode; and a control unit configured to control so that, in a case where switching from the first recording mode to the playback mode is performed by the switching unit, a first playback screen is displayed, for performing a display treating a moving image, recorded from a recording start of the moving image until a recording end of the moving image by the moving image recording unit, as a single unit, and to control so that, in a case where switching from the second recording mode to the playback mode is performed by the switching unit, a second playback screen is displayed, for performing a display treating the scene as a single unit based on the information recorded by the information recording unit.

Furthermore, according to another aspect of the present invention, there is provided an image playback method performed by an image playback apparatus, the method comprising: a moving image recording step of controlling so that a moving image is recorded on a recording medium; an information recording step of controlling so as to, while continuing the recording of the moving image, record information indicating a start of a scene which is a portion of the moving image being recorded and information indicating an end of the scene which is the portion of the moving image being recorded in association with the moving image being recorded; a setting step of setting a recording mode from out of a plurality recording modes including a first recording mode in which a recording of the information is not performed in the information recording step during recording of a moving image in the moving image recording step, and a second recording mode in which a recording of the information can be performed in the information recording step during recording of a moving image in the moving image recording step; a switching step of switching between a recording mode and a playback mode; and a control step of controlling so that, in a case where switching from the first recording mode to the playback mode is performed in the switching step, a first playback screen is displayed, for performing a display treating a moving image, recorded from a recording start of the moving image until a recording end of the moving image in the moving image recording step, as a single unit, and to control so that, in a case where switching from the second recording mode to the playback mode is performed in the switching step, a second playback screen is displayed, for performing a display treating the scene as a single unit based on the information recorded in the information recording step.

Further features of the present invention will become apparent from the following description of exemplary embodiments with reference to the attached drawings.

BRIEF DESCRIPTION OF THE DRAWINGS

FIGS. 2A and 2B are flowcharts for showing overall processing of present embodiments.

FIGS. 3A-3G are flowcharts for showing continuous recording mode processing of present embodiments.

FIGS. 8A and 8B are views for illustrating a continuous recording mode selection screen in a menu screen.

FIGS. 10A and 10B are views for representing status display examples during continuous recording ON.

FIG. 15 is a view for representing a continuous recording user operation, a moving image file, and management information.

DESCRIPTION OF THE EMBODIMENTS

Embodiments of the present invention will be described hereinafter in detail, with reference to the accompanying drawings.

In embodiments below, an image recording apparatus and an image recording method, that can avoid situations in which recording start/stop operations by the photographer do the opposite of what the photographer intends to do, and in which in point/out point information can be input with good operationality, are disclosed. Also, in the below embodiments, an image recording apparatus and an image recording method capable of performing an information display that is highly convenient to a user when the user adds information corresponding to an in point and an out point during recording of a moving image are provided. Also, in the embodiments below, an image playback apparatus and an image playback method configured to able to handle a moving image in suitable units matching with an user operation state are provided.

Figure 1:
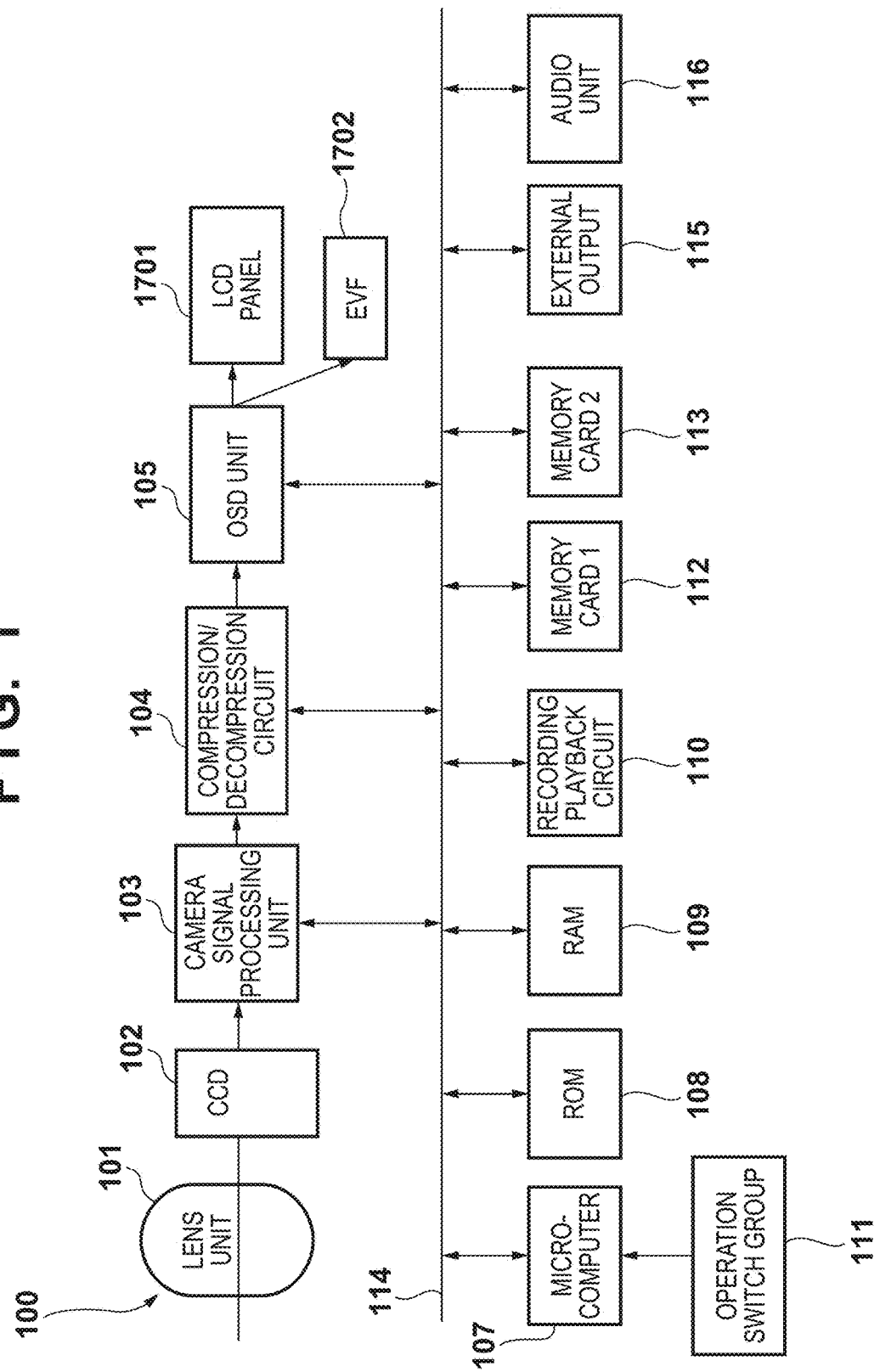
FIG. 1 is a block diagram for showing an internal configuration example of an image recording apparatus 100 according to embodiments.

FIG. 1 is a block diagram for showing an internal configuration example of an image recording apparatus 100 (also an image playback apparatus) according to embodiments. In FIG. 1, a lens unit 101 is comprised of a fixed lens group for focusing, a zoom lens group, an aperture, and a correction lens group equipped with both a function for correcting an image forming position moved by a movement of the zoom lens group, and a function for performing focusing control. With the lens unit 101, a subject image is finally formed on an imaging plane of a later described CCD 102.

The CCD (charge coupled device) 102 generates an image signal by converting light into charge. A camera signal processing unit 103 outputs digital image data by applying predetermined processing to the image signal. A compression/decompression circuit 104 (MPEG) compresses the digital image data, and generates compressed video data. Also, the compression/decompression circuit 104 is also provided with a function to input MPEG compressed video data and decompress it.

A microcomputer 107 controls the image recording apparatus 100 on the whole. A ROM 108 is a non-volatile memory such as a flash memory, or the like, and programs that the microcomputer 107 executes are stored in it. Also, a partial region of the ROM 108 is used as a backup, and holds system statuses, and the like. A RAM 109 is a volatile memory that the microcomputer 107, the compression/decompression circuit 104, and the like, use as a work memory. The microcomputer 107 performs various display control by controlling an OSD unit 105.

A bus 114 is connected to each unit of the image recording apparatus 100. A memory card A 112 and a memory card B 113 are recoding mediums for recording compressed video data generated by the compression/decompression circuit 104 in accordance with a predetermined format compatible with a computer having a FAT file system, for example. These memory cards are removable recording medium removable from the image recording apparatus 100, and they can be mounted to a PC, or the like, outside of the image recording apparatus. A recording playback circuit 110 records compressed video data (moving image data) generated by the compression/decompression circuit 104 into the memory card A 112 or the memory card B 113 in accordance with a format compatible with a computer having a FAT file system, or the like.

The OSD unit (On-Screen Display) 105 superimposes information such as various setting menus, title, and durations onto digital image data. Also, the OSD unit 105 outputs overlapped digital image data, or the like, onto an LCD panel 1701, an EVF 1702, or the like, and performs control for displaying a digital image onto these. The LCD panel 1701 is a display which receives control from the OSD unit 105 and displays a digital image. The EVF 1702 is an electronic view finder visible through an eye piece. Hereinafter, the LCD panel 1701 and the EVF 1702 are collectively referred to as the display module. A display destination of video is settable to be only the LCD panel 1701, only the EVF 1702, or both the LCD panel 1701 and the EVF 1702 in accordance with a user operation.

An external output 115 outputs a digital image output by the camera signal processing unit 103 to an external unit. An audio unit 116 is equipped with a microphone unit, and a speaker, and the compression/decompression circuit 104 performs compression/decompression of audio data as well as image data. In other words, audio data is multiplexed onto the previously described compressed video data. An operation switch group 111 is various operation components for a user to perform operation input. Operation components such as a power switch 1706, a START/STOP button 1705, and a status button 1708, which are explained later with FIG. 17A and FIG. 17B, for example are included in the operation switch group 111.

Figure 17A:
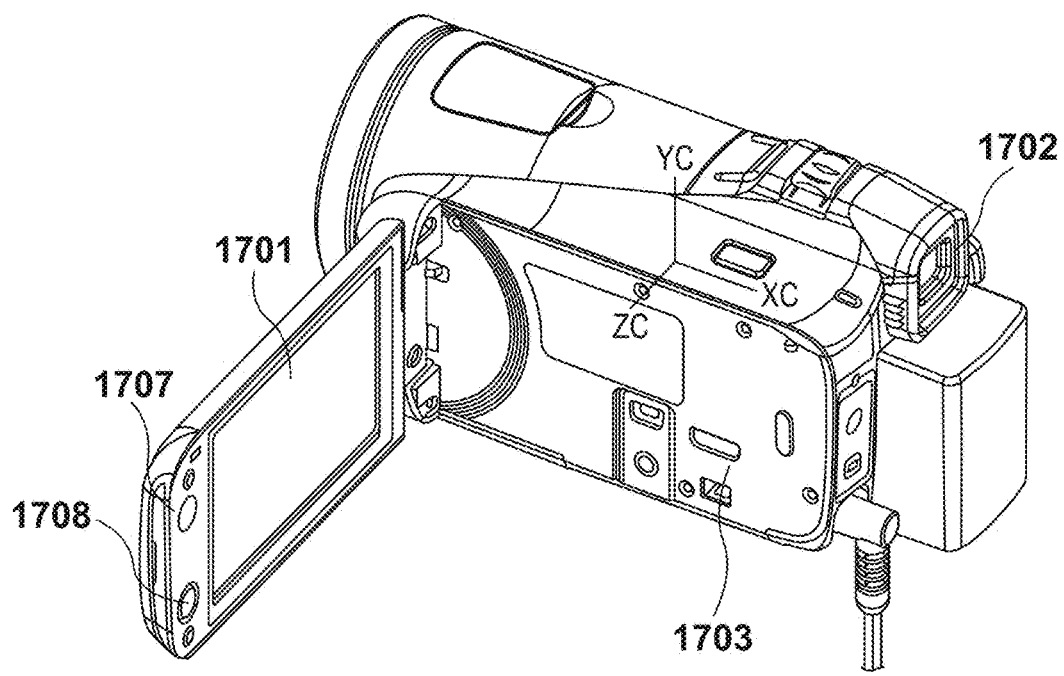
FIGS. 17A and 17B are perspective views of the image recording apparatus according to embodiments.
Figure 17B:
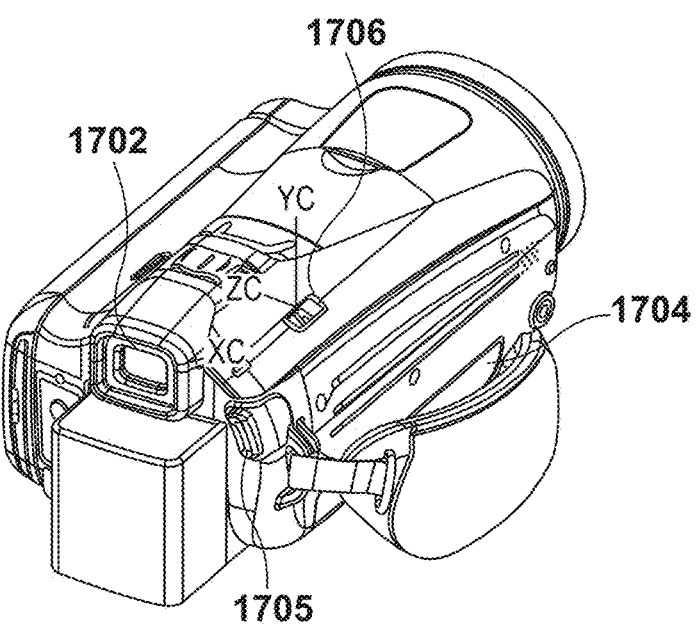

FIG. 17A and FIG. 17B are perspective views of the image recording apparatus according to embodiments. FIG. 17A is an external perspective view for representing a state in which an image display unit of the image recording apparatus is open, and FIG. 17B is an external perspective view from the perspective of a photographer looking at the image recording apparatus (a back side).

In FIG. 17A, numeral 1701 denotes an LCD (Liquid Crystal Display) panel, and numeral 1702 denotes an EVF (Electronic View Finder). Numeral 1703 is an output terminal for connecting an external video display apparatus and outputting a video in order to display the video. Numeral 1707 denotes a menu button, and is a button for performing opening and closing of a menu screen for performing a setting change of the image recording apparatus 100 or the like. The status button 1708 is a button for opening and closing a screen for indicating a setting or a state of the image recording apparatus 100.

In FIG. 17B, numeral 1704 denotes a grip belt, and this is for supporting a hand that is holding the camera. The START/STOP button 1705 is a button for making an instruction for a video recording start or stop. The power switch 1706 is an operation unit for switching between an image capturing mode, a playback mode, and a power OFF mode of the image recording apparatus 100.

Here, the image capturing mode is a mode in which light that the lens unit 101 collects is photo electrically converted by the CCD 102 and data obtained by performing signal processing with the camera signal processing unit 103 is output to the external output 115, and the display module. In the image capturing mode, when an operator makes an instruction for a recording start to the image recording apparatus 100 by operating the operation switch group 111, data that is signal processed by the above described camera signal processing unit 103 is compressed by the compression/decompression circuit 104, and recorded in the memory card A 112 and the memory card B 113.

Furthermore, in the image capturing mode, switching between the at least two kinds of modes of a normal recording mode for performing normal moving image recording, and a continuous recording mode is possible. In the normal recording mode, a start and stop of a real recording is performed by operations of the START/STOP button 1705. Also, in the continuous recording mode, a start and a stop of a virtual recording are performed by operations of the START/STOP button 1705 while continuing a continuous real recording. Real recording and virtual recording will be explained later.

Also, in the playback mode, after decompressing a moving image recorded in the memory card A 112 or the memory card B 113 with the compression/decompression circuit 104, an obtained image is overlapped with OSD information by the OSD unit 105, and output to the display module and/or output to the external output 115. Also, the power OFF mode is a mode in which the functions of the image recording apparatus 100 are all made to be in an off state.

The various buttons explained here are included in the operation switch group 111 of FIG. 1. Here, the START/STOP button 1705 is arranged in a position with good operability that is suitable for instructing a start/stop of a recording when the image recording apparatus 100 is held by hand with the grip belt 1704 attached. In other words, the START/STOP button 1705 is arranged in a position operable by a finger (normally, the thumb of the right hand) of a hand (the hand holding the image recording apparatus 100) that is passed through the grip belt 1704. That is, the START/STOP button 1705 is an operation key that the user is able to access directly. In this way, the position of the START/STOP button 1705 is a position to which the thumb of a right hand holding the image recording apparatus 100 passed through the grip belt 1704 arrives at naturally. For this reason, even in a case where the user is looking at the EVF 1702 and not looking at the operation switch group 111, the user is able to operate the START/STOP button 1705 easily. In other words, the START/STOP button 1705 is an important button for instructing a start and a stop of image capturing, and because it is directly linked to the quality of the usability, it is arranged in a position that is easy to access for the user.

«Operation in the Image Capturing Mode»

Figure 2A:
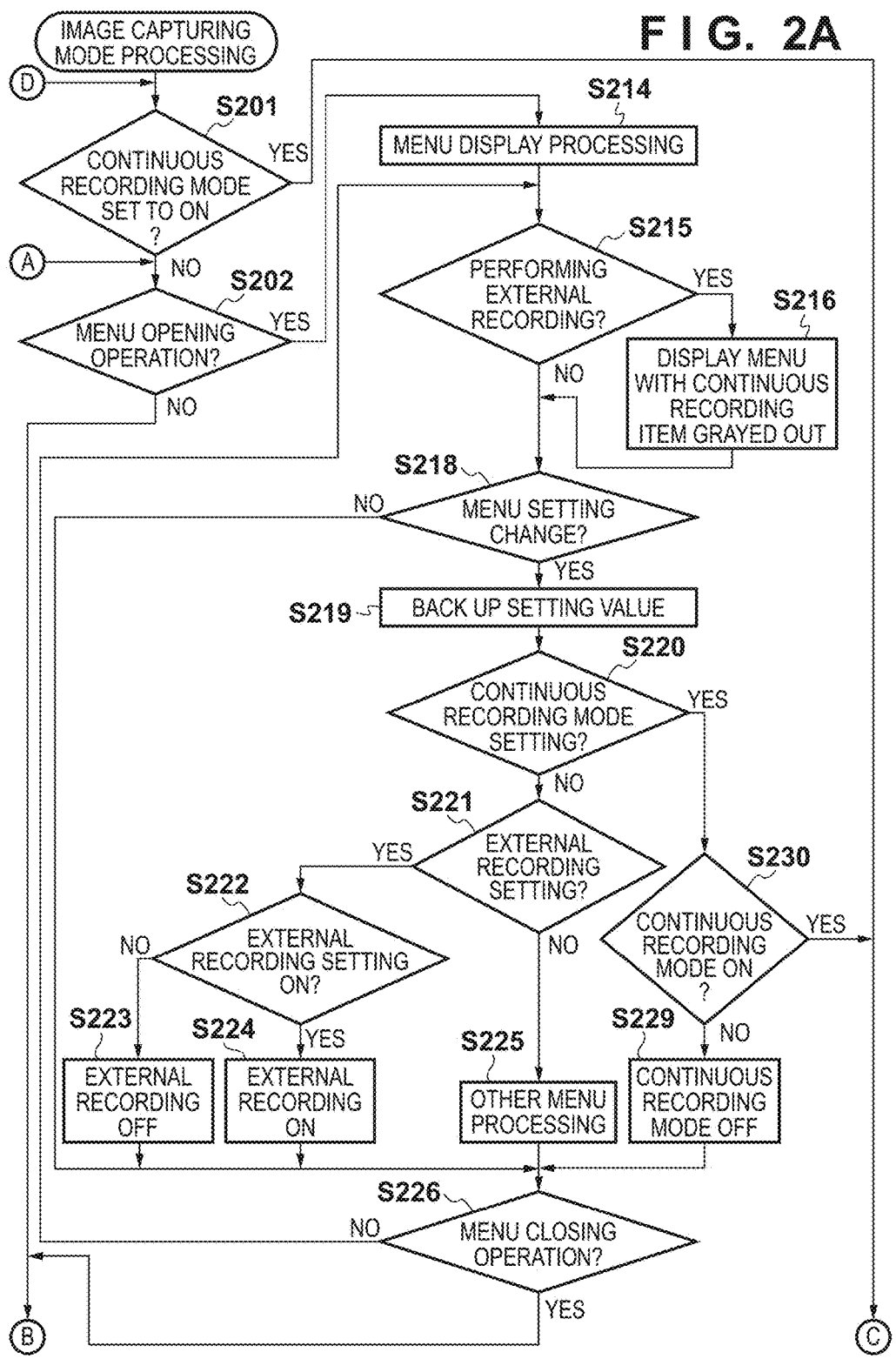

In FIG. 2A and FIG. 2B, flowcharts for image capturing mode processing in the present embodiment are shown. The processing shown in the flowcharts of FIG. 2A and FIG. 2B is realized by the microcomputer 107 of the image recording apparatus 100 executing a program stored in the ROM 108, for example. Note, the recording format for the moving image is the AVCHD standard recording format, but the recording format is not limited to this. With an operation of the power switch 1706, the processing from step S201 is initiated when the image recording apparatus 100 is activated in the image capturing mode.

In step S201, the microcomputer 107 reads out backup information from the ROM 108. In the backup information, information as to whether the continuous recording mode is on or off is included. The continuous recording mode is an operation mode in which continuous recording is performed wherein based on an operation of a user while performing a recording of an image to a recording medium constantly, an in point/out point is attached as attribute information to the moving image being recorded. The microcomputer 107 determines whether or not the image recording apparatus 100 is operating in the continuous recording mode from the backup information. In a case where the continuous recording mode was on, the processing proceeds to step S227, and in a case where the continuous recording mode was off, the processing proceeds to step S202.

In step S202, the microcomputer 107 determines whether or not an operator performed an instruction for opening a menu on the image recording apparatus 100 by operating (pressing the menu button 1707) the operation switch group 111. If an instruction for opening the menu is not performed, the processing proceeds to step S203, and if an instruction for opening the menu is performed, the processing proceeds to step S214.

In step S203, the microcomputer 107 determines whether or not a moving image recording start is instructed to the image recording apparatus 100 from the existence or absence of a pressing of the START/STOP button 1705 in the operation switch group 111. In a case where it is determined that the START/STOP button 1705 is pressed (a moving image recording start is instructed), the processing proceeds to step S212, and the microcomputer 107 performs normal moving image recording processing by controlling the image recording apparatus 100. Details of the processing (normal moving image recording processing) of step S212 will be explained later using FIG. 4A and FIG. 4B. Also, in a case where in step S203, the START/STOP button 1705 is determined to not be pressed (a moving image recording start is not instructed), the processing proceeds to step S204.

In step S204, the microcomputer 107 determines whether the status button 1708 in the operation switch group 111, for displaying a status of the main body, is pressed. In a case where it is determined that the status button 1708 is pressed, the processing proceeds to step S205, and in a case where it is determined that the status button 1708 is not pressed, the processing proceeds to step S206. In step S205, the microcomputer 107, by controlling the OSD unit 105, performs an output of a status screen to the LCD panel 1701 and the external output 115. The display of the status screen here is a status display in an operation mode other than the continuous recording mode (for example, the normal recording mode).

Figure 7A:
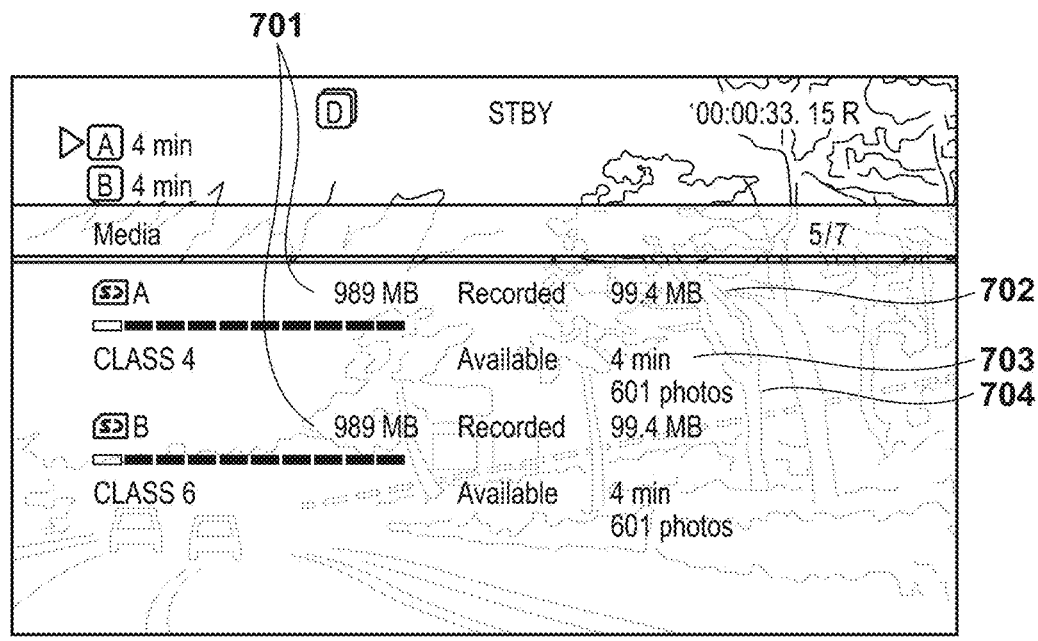
FIGS. 7A and 7B are views for showing display examples in a normal recording mode.

In FIG. 7A, a display example of the status screen in the normal recording mode displayed in step S205 is shown. FIG. 7A is a display example of a status screen when in normal recording mode (continuous recording: OFF) that is displayed on the display module in step S205. In the status screen, information of the memory card A 112 and the memory card B 113 is displayed. As display content, a remaining amount 701, an already recorded capacity 702, a remaining recordable duration 703, and a remaining still image recordable number 704 of each memory card is displayed.

In step S206, the microcomputer 107 determines whether or not switching (hereinafter referred to as mode switching) to another mode is instructed by an operation of the operation switch group 111 by the operator. In a case where it is determined that a mode switching is instructed, the processing proceeds to step S209, and in a case where it is determined that mode switching is not instructed, the processing proceeds to step S207. In step S207, the microcomputer 107 determines whether the operator made another main body operation on the image recording apparatus 100 by operating the operation switch group 111. The other main body operation may be changing a parameter of the camera, or changing a level of audio for example. In a case where another main body operation is detected, the processing proceeds to step S208, and when one is not detected, the processing proceeds to step S213. In step S208, the microcomputer 107 changes a setting state of the image recording apparatus 100 in accordance with the detected main body operation.

In step S209, the microcomputer 107 determines whether a transition to the playback mode is instructed to the image recording apparatus 100 by an operation of the operation switch group 111 of the operator. In a case where a transition to the playback mode is instructed, the processing proceeds to step S211, and in a case where a transition to the playback mode is not instructed, the processing proceeds to step S210. In step S210, the microcomputer 107 executes power off mode processing of the image recording apparatus 100, stops each function, and causes the image recording apparatus 100 to transition into a power off state. Details of the power off mode processing will be explained later using FIG. 6. Also, in step S211, playback mode processing is executed by the microcomputer 107 controlling the image recording apparatus 100. Details of the playback mode processing will be explained later using FIGS. 5A-5B.

In step S213, the microcomputer 107 determines whether the image capturing mode has completed. When it is determined that the image capturing mode has completed, this processing ends. In a case where it is determined that the image capturing mode has yet to be completed, the processing returns to step S201.

Meanwhile, in a case where it is determined in step S202 that an operation to open the menu is performed, in step S214, the microcomputer 107, by controlling the OSD unit 105, displays the menu on the display module and outputs information for a menu display to the external output 115.

FIG. 8A and FIG. 8B illustrate display examples of the menu screen displayed in step S214 FIG. 8A and FIG. 8B are display examples of a selection screen for selecting whether or not to perform continuous recording (ContinuousREC) in a hierarchical structure of an item "Other Functions" of the menu. The operator can select either the continuous recording mode or the normal recording mode by setting continuous recording (ContinuousREC) to be on or off by operating the operation switch group 111. When an operation is received, the microcomputer 107 causes the image recording apparatus 100 to transition into the selected mode by controlling the image recording apparatus 100 on the whole.

FIG. 8A is a display example of a case in which continuous recording (ContinuousREC) is selected to be on in the menu. A setting change is performed at the point in time when continuous recording is selected to be on, and a mode status display 801 (the character string "CONT") indicating that the continuous recording mode is entered is displayed. FIG. 8B is a display example of a case in which continuous recording (ContinuousREC) is selected to be off in the menu. The setting is changed to the normal recording mode at the point in time when continuous recording is selected to be off, and the mode status display 801 displayed in the case of the continuous recording mode (the character string "CONT") becomes non-displayed. Note, a REC status display 802 indicating a recording status indicates whether the image recording apparatus 100 is in a recording state (REC) or in a standby state (STBY). Note, the item for continuous recording (ContinuousREC) is grayed out and a selection by the operator is inhibited in a state in which the image recording apparatus 100 cannot transition into the continuous recording mode. Note, in the menu, items other than the item for continuous recording (ContinuousREC) explained above such as a setting for an external recording control are displayed.

In step S215, the microcomputer 107 determines whether the image recording apparatus 100 is performing an external recording. The external recording means outputting video output and a video recording instruction command to a connected external apparatus through the external output 115. For example, in a case where the external output 115 is an SDI output, an SDI ancillary data (ANC data) external recording flag is set to be on when performing an external recording, and the external recording flag is set to be off when not performing an external recording. This external recording flag is received by the external device receiving output from the external output 115, and is used to determine whether or not to record a video signal received by the external device. In a case where, out of the menu items in the menu the setting value of the item for external recording control (ON/OFF) is in the on state, the above described control (external recording) is performed, and when this item is in the off state, the above described control is not performed. In a case where it is determined that an external recording is being performed in step S215, the processing proceeds to step S216. Also, in a case where it is determined that an external recording is not being performed, the processing proceeds to step S218. Note, SDI (Serial Digital Interface) is a high speed serial interface standard mainly used in professional-use video devices. In SDI, a non-compressed digital video signal and digital audio signal can be transmitted by a single coaxial cable.

In a case where it is determined that an external recording is being performed, the microcomputer 107, by controlling the OSD unit 105, in step S216, grays out and makes unselectable a continuous recording item of the menu for which display output to the display module, the external output 115, or the like, is performed. After this, the processing proceeds to step S218. In step S218, the microcomputer 107 determines whether or not an operation for making a setting change is performed in the menu displayed in step S214. In a case where it is determined that a setting change operation is performed, the processing proceeds to step S219, and in a case where it is determined that a setting change operation is not performed, the processing proceeds to step S226. In step S219, the microcomputer 107 records a setting after it is changed by the menu operation of the operator such as, for example, the setting of whether continuous recording is on or off, the setting of whether the external recording control setting is on or off, or the like, to the ROM 108 as backup information.

In step S220, the microcomputer 107 determines whether or not the setting saved in the ROM 108 as backup information in step S219 due to the operation on the menu is the setting for continuous recording of the image recording apparatus 100. In a case where it is determined that the setting for continuous recording is performed, the processing proceeds to step S230, and in a case where it is determined that the setting for continuous recording is not performed, the processing proceeds to step S221.

In step S230, the microcomputer 107 determines whether the setting for continuous recording is on or off in the backup information saved in the ROM 108. In a case where continuous recording is on, the processing proceeds to step S227, and in a case where it is off, the processing proceeds to step S229. In step S229, the microcomputer 107 sets the continuous recording mode in the image recording apparatus 100 to be in an off state. The off state of the continuous recording mode is a state in which the image recording apparatus 100 executes moving image recording processing (step S212) in the normal recording mode. After this, the processing proceeds to step S226. In step S227, the microcomputer 107 causes the image recording apparatus 100 to transition into the continuous recording mode. Also, in step S228, the continuous recording mode processing is executed by the microcomputer 107 controlling the image recording apparatus 100. Details of the operation in the continuous recording mode will be explained later using FIGS. 3A-3G. After this, the processing proceeds to step S213.

In a case where in step S220 it is determined that the setting for continuous recording is not performed, the microcomputer 107, in step S221, determines whether or not a setting for external recording control is performed by a menu operation. In a case where it is determined that a setting for external recording control is performed, the processing proceeds to step S222, and in a case where it is determined that it is not performed, the processing proceeds to step S225.

In step S222, the microcomputer 107 determines whether or not the setting of the external recording control is on from the backup information recorded in the ROM 108 in step S219. In a case where the setting of the external recording control is on, the processing proceeds to step S224, and in a case where it is off, the processing proceeds to step S223. In step S223, the microcomputer 107 sets external recording to an off state. Setting external recording to the off state means setting to a state in which control of the SDI ancillary data external recording flag, as explained in step S215, is not performed in a case of SDI, for example. After this, the processing proceeds to step S226. In step S224, the microcomputer 107 sets external recording to an on state. Setting external recording to the on state means setting to a state in which control of the SDI ancillary data external recording flag, as explained in step S215, is performed in a case of SDI, for example. After this, the processing proceeds to step S226.

In step S225, the microcomputer 107, in accordance with another menu operation that the operator performed using the operation switch group 111, performs corresponding menu processing. After this, the processing proceeds to step S226. In step S226, the microcomputer 107 receives an operation of the operation switch group 111 of the operator, and determines whether an operation for closing the menu is performed. In a case where the operation for closing the menu is not performed, the processing returns to step S215, and in a case where there is an operation for closing the menu, the processing proceeds to step S203.

Next, explanation will be given for the continuous recording mode processing executed in step S228 of FIG. 2B using FIGS. 3A-3G. Note, the processing shown in the flowcharts of FIG. 3A-FIG. 3G is realized by the microcomputer 107 comprised in the image recording apparatus 100 executing a program stored in the ROM 108, for example.

Step S301-step S313 show a processing loop of standing by (real recording/virtual recording not being performed) in the continuous recording mode. In step S301, the microcomputer 107 causes the image recording apparatus 100 to enter a double recording setting state. Double recording is a mode in which the same video data is recorded into the memory card A 112 and the memory card B 113. Whether or not double recording is executed is determined by later described processing. Here it is only determined whether or not double recording is set as a setting of the main body. In step S302, the microcomputer 107 causes the display of the image recording apparatus 100 to be a standby display in the continuous recording mode by controlling the OSD unit 105.

Figure 9A:
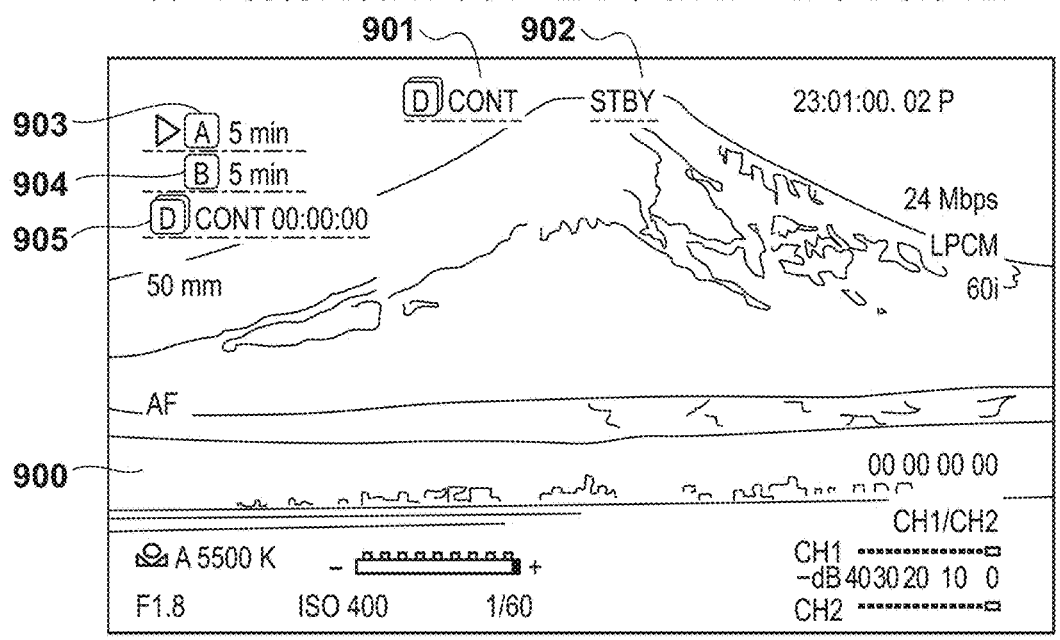
FIGS. 9A-9D are views for showing screen display examples in the continuous recording mode.

In FIG. 9A, a display example of a recording standby display in the continuous recording mode is shown. A through image 900 (live view image) is overlapped by a mode status display 901 and a REC status display 902. Also, overlapped on the through image 900, a remaining recordable duration 903 of the memory card A 112, a remaining recordable duration 904 of the memory card B 113, and an already recorded duration 905 in a virtual recording in continuous recording are displayed. Note, display forms explained below with FIG. 9A-FIG. 9D are only examples, and display forms other than these display forms, that can achieve notification of the states explained below may also be used.

The mode status display 901 indicates whether the continuous recording mode is turned on or whether it is turned off. In a case where the continuous recording mode is turned on, the character string "CONT" is displayed, and in a case where the continuous recording mode is turned off, the character string "CONT" is not displayed. Also, the mode status display 901 also serves as a display for whether or not a real recording is being performed in the continuous recording mode. If a real recording is being performed, an addition of a frame, hatching, a red display, or the like, to the character string "CONT" is performed, and the character string "CONT" is displayed normally (for example, without a frame or hatching, in white) if real recording is not being performed.

The REC status display 902 indicates whether or not virtual recording is being performed in continuous recording, and if virtual recording is being performed, a display item "●REC" is displayed, and if virtual recording is not being performed, a display item "STBY" is displayed. Note, in a case of the normal recording mode, the REC status display 902 does not indicate whether or not virtual recording is being performed, but rather whether or not real recording is being performed. In other words, in the normal recording mode, if a real recording is being performed, "●REC" is displayed, and if real recording is not being performed, "STBY" is displayed.

In the already recorded duration 905 in the virtual recording, the longer duration is displayed from out of moving images (virtual recording portions) recorded for in points and out points in a virtual playlist already recorded in the memory card A 112 and the memory card B 113. In a case where multiple sets of in points and out points are already recorded for a moving image being recorded, this is the total time from these in points to these out points (in other words, it is the total time of the plurality of scenes corresponding to the in points and the out points recorded in association with the moving image being recorded). When a limited event such as a wedding is imaged, a situation understanding as to whether an actual recording (real recording portion) is indeed being performed is necessary, and so here a photographer is able to understand the situation with the displays of the mode status display 901 and the REC status display 902. Also, it is necessary for the photographer to understand whether or not a portion (virtual recording duration) recorded with the intention of using editing after image capturing is captured sufficiently for a duration necessary for a post-editing moving image. For this, by looking at the display of the already recorded duration 905 in the virtual recording, the user is able to understand the length of the portion recorded in the virtual recording. A portion recorded in a virtual recording is not a portion (only the real recording portion) that the photographer captures just in case, but rather is a portion captured considering that the portion is necessary for an after image capture post-editing moving image product. Accordingly, by understanding the length of the portion recorded in the virtual recording, it is possible to understand whether or not a duration necessary for the post-editing moving image is sufficiently captured.

In step S303, the microcomputer 107 determines whether or not the operator made an instruction for opening a menu by operating the menu button 1707. If the operator made an instruction for opening the menu, the processing proceeds to step S314, and if the operator did not make an instruction for opening the menu, the processing proceeds to step S304. In step S304, the microcomputer 107 determines whether the operator presses the status button 1708. If the status button 1708 is pressed by the operator, the processing proceeds to step S305, and if the status button 1708 is not pressed, the processing proceeds to step S306. In step S305, an output of a status screen to the LCD panel 1701 and the external output 115 is performed by the microcomputer 107 controlling the OSD unit 105.

Figure 10A:
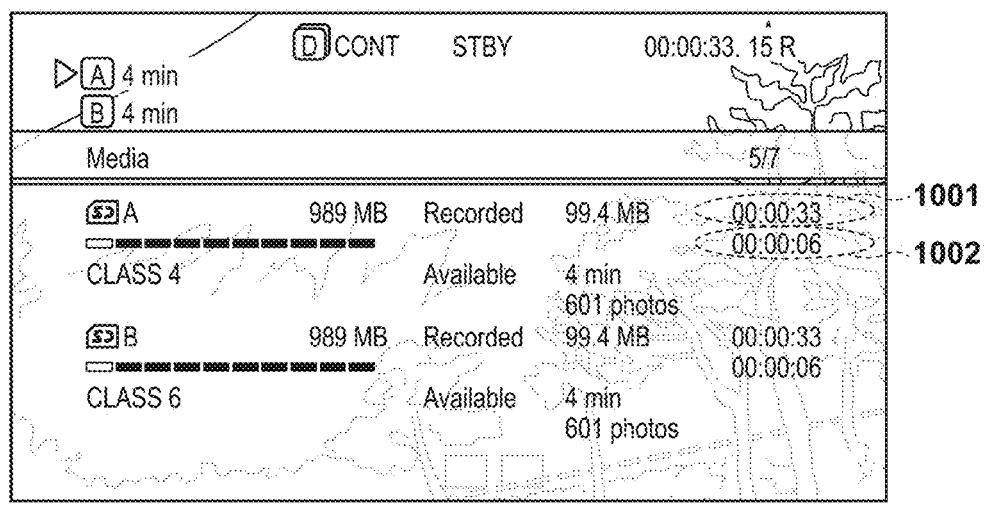

In FIG. 10A, a display example of the status screen for when a real recording and a virtual recording are stopped in the continuous recording mode displayed in step S305 is shown. Other than information displayed in the status screen in the normal recording mode explained in FIG. 7A, a playback total duration 1001 of a scene recorded in a real playlist and a playback total duration 1002 of a scene recorded in a virtual playlist are displayed separately from the memory cards.

In step S306, the microcomputer 107 determines whether the operator presses the START/STOP button 1705. In a case where it is determined that the START/STOP button 1705 is not pressed, the processing proceeds to step S307, and in a case where it is determined that the START/STOP button 1705 is pressed, the processing proceeds to step S326. In step S307, the microcomputer 107 determines whether or not mode switching is instructed with an operation of the power switch 1706. If mode switching is instructed, the processing proceeds to step S310, and if mode switching is not instructed, the processing proceeds to step S308. In step S308, the microcomputer 107 determines whether or not the operator performed another operation on the operation switch group 111. The other operation may be changing a setting parameter pertaining to image capturing, or changing a level of audio for example. In a case where another operation is performed, the processing proceeds to step S309, and processing suitable to the content of the setting change is performed. In a case where another operation is not performed, the processing proceeds to step S313.

In step S310, the microcomputer 107 determines whether or not a transition to the playback mode is instructed with an operation on the power switch 1706 of the operator. In a case where a transition to the playback mode is instructed, the processing proceeds to step S312. In a case where the power switch 1706 is operated and the operation is not a switching to the playback mode, the operation is a switching to the power OFF mode. Accordingly, in such a case, the processing proceeds to step S311. In step S311, the microcomputer 107 executes power off mode processing. In other words, the microcomputer 107 causes transition into a powered off state by stopping functions of the image recording apparatus 100. Details of the power off mode processing will be explained later using FIG. 6. After this, the processing proceeds to step S313. Also, in step S312 the microcomputer 107 causes the image recording apparatus 100 to transition into the playback mode. Details of the playback mode processing will be explained later using FIGS. 5A-5B. After this, the processing proceeds to step S313.

In step S313, the microcomputer 107 determines whether or not the continuous recording mode ends in the image recording apparatus 100. In a case where the continuous recording mode has not ended, the processing proceeds to step S301, and in a case where the continuous recording mode ended, this processing ends. For example, in a case where a switching to another mode is instructed, or a case of an end cause such as the remaining capacity of a battery running out, the continuous recording mode completes.

When, in step S303, it is determined that an instruction for opening the menu is performed, the processing proceeds to step S314. Processing of step S314-step S324 is menu processing during standby operation in the continuous recording mode. In step S314, the microcomputer 107, by controlling the OSD unit 105, displays the menu to the display module and outputs the display screen of the menu to the external output 115. Processing for displaying the menu is the same as that of step S214, and a menu screen as in FIG. 8A or FIG. 8B is displayed. In step S315, the microcomputer 107 determines whether or not an operation for making a setting change is performed in the menu displayed in step S314. In a case where a setting change operation is performed, the processing proceeds to step S316, and in a case where a setting change operation is not performed, the processing proceeds to step S324.

In step S316, the microcomputer 107 records setting content of the various menu items after the change that operator makes with an operation on the menu as backup information in the ROM 108. In step S317, the microcomputer 107 determines whether setting of the external recording control is performed by the operator with an operation on the menu with reference to the backup information. In a case where the setting of external recording control is performed, the processing proceeds to step S318, and in a case where the setting of external recording control is not performed, the processing proceeds to step S321.

In step S318, the microcomputer 107 determines whether or not the setting of the external recording control set in steps S221-S224 is on from the backup information recorded in the ROM 108. In a case where the setting of the external recording control is on, the processing proceeds to step S320, and in a case where the setting of the external recording control is off, the processing proceeds to step S319. In step S319, the microcomputer 107 sets external recording to an off state. Setting external recording to the off state means setting to a state in which control of the SDI ancillary data external recording flag as explained in step S215 is not performed in a case of SDI, for example. Meanwhile, in step S320, the microcomputer 107 sets external recording to an on state. Setting external recording to the on state means setting to a state in which control of the SDI ancillary data external recording flag as explained in step S215 is performed in a case of SDI, for example.

In step S321, the microcomputer 107 determines whether a continuous recording start (a start of real recording/virtual recording) is set by a continuous recording start/stop item being selected in the menu (that is, not by the START/STOP button 1705 being pressed). In a case where a continuous recording start is set, the processing proceeds to step S325, and in a case where the continuous recording start is not set, the processing proceeds to step S322.

In step S322, the microcomputer 107 determines whether or not the continuous recording mode is set to on. Here, because the current operation mode is the continuous recording mode, the determination is for whether or not continuous recording is set to be off with an operation on the menu screen. In a case where the continuous recording mode is set to be off, the continuous recording mode ends, and the processing proceeds to step S202 of FIG. 2A. In a case where the continuous recording mode is set to be on, the processing proceeds to step S323. In step S323, the microcomputer 107 performs menu processing in accordance with another operation performed in the menu screen.

Next, in step S324, the microcomputer 107 receives an operation of the operation switch group 111 of the operator, and determines whether or not an operation for closing the menu is performed. In a case where an operation for closing the menu is not performed, the processing returns to step S315. In a case where there was an operation for closing the menu, the microcomputer 107, by controlling the OSD unit 105, performs processing for ending the menu display displayed on the display module, and the menu display output to the external output 115, and the processing proceeds to step S304.

When it is determined in step S321 that the continuous recording start is set, the processing proceeds to step S325. In step S325, the microcomputer 107, by controlling the OSD unit 105, performs processing for ending the display of the menu displayed on the display module and the menu display output to the external output 115. After this, the processing proceeds to step S326.

Step S326-step S336 is processing for starting a real recording and a virtual recording in the continuous recording mode. Firstly, in step S326, the microcomputer 107 determines whether the memory card A 112 and the memory card B 113 are in a mounted state. If both of the media are in a mounted state, the processing proceeds to step S327, and in only one of the media is mounted, the processing proceeds to step S328.

Note, when the memory cards are mounted, mounting processing is performed. Mounting processing is processing that is performed for loading management information, such as a real playlist recorded on the mounted memory card, into the RAM 109 in a case where a moving image file has been already recorded on the mounted memory card in addition to putting the memory card into an accessible state. Also, from the durations of the in point and the out point of each scene recorded in the real playlist and the virtual play list, a total duration of scenes of the real playlist recorded on each card, and a total duration of scenes of the virtual playlist on each card are calculated and stored in the RAM 109. Though it will not described explicitly in the recording operation of the embodiment explained below, the total duration of the scenes of each playlist stored in the RAM 109 is updated each time a recording of a scene of a moving image is performed for each of the target playlists.

In step S327, the microcomputer 107 causes transition into a double recording state by controlling the image recording apparatus 100. The double recording state is a state is which a moving image recording into both the memory card A 112 and the memory card B 113 is possible. In a case where this mode (the double recording state) is not entered, the image recording apparatus 100 is in a single recording state in which a moving image is only recorded into only one of the memory card A 112 and the memory card B 113. In the later described explanation, double recording and single recording will not described explicitly, but in a case where the image recording apparatus 100 is in the single recording state, the microcomputer 107 sets a state so that the moving image is recorded into either the memory card A 112 or the memory card B 113 in step S327. Also, in a case where the image recording apparatus 100 is in the double recording state, the moving image is recorded into both the memory card A 112 and the memory card B 113.

In step S328, the microcomputer 107 checks a continuation condition for real recording and a continuation condition for virtual recording. It is determined whether either of the memory card A 112 and the memory card B 113 is not mounted (in a no-media state), or if a lid of a slot to which a memory card is mounted is open (a lid open state). In a case of the no-media state or the lid open state, the processing proceeds to step S329, and in a case where the state is neither of these, the processing proceeds to step S331. Note that, as conditions under which real recording cannot continue, there are also:

an amount of data recorded in a memory card reaches an upper limit of the capacity of the recording medium a number of scenes recorded to a memory card reaches an upper limit a number of real playlists recorded to a memory card reaches an upper limit Also, as conditions under which virtual recording cannot be performed, there are:

a number of virtual recording scenes recorded to a memory card reaches an upper limit a number of virtual playlists recorded to a memory card reaches an upper limit.

In a case where at least one of these conditions is matched, it is determined that a continuation condition is not satisfied, the processing proceeds to step S329. In step S329, the microcomputer 107, by controlling the OSD unit 105, displays a warning that recording cannot be performed to the display module and the external output 115. Display examples according to causes are shown in FIG. 16A, FIG. 16B, FIG. 16C, FIG. 16D, and FIG. 16E.

Figure 9B:
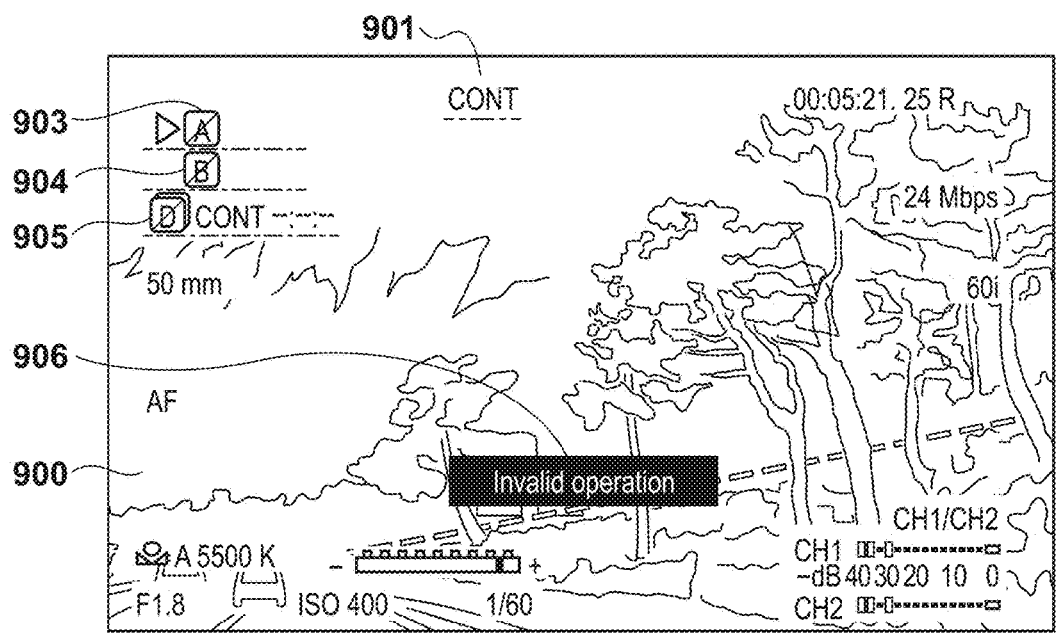

In step S330, the microcomputer 107, by controlling the OSD unit 105, displays a guide (warning) that continuous recording cannot be performed on the display module and outputs the same guide (warning) from the external output 115. In FIG. 9B, a display example of a recording impossible state when continuous recording is on displayed in step S330 is shown. In such a case, a message 906 that recording start processing cannot be performed is displayed on the through image 900. Also, the characters "A" and "B" included in the remaining recordable duration 903 of the memory card A 112, and the remaining recordable duration 904 of the memory card B 113 are displayed in a display form to the effect that the state is such that continuous recording is impossible (for example, using red) (normally, the "A" and "B" are displayed in white). Here, a numeric value for a remaining duration for each memory card is not displayed.

In step S331, the microcomputer 107 performs continuous recording moving image recording processing. The continuous recording moving image recording processing is processing in which light that the lens unit 101 collects is photo electrically converted by the CCD 102, and the output of this being signal processed by the camera signal processing unit 103 is compressed by the compression/decompression circuit 104, and recorded in the memory cards A 112, and B113 by the recording playback circuit 110. In step S332, the microcomputer 107 adds information of the moving image for which the moving image recording is started in step S331 to the real playlist loaded into the RAM 109 as a new scene. In step S333, the microcomputer 107 records a time stamp of a lead frame of video data which starts the moving image recording in step S331, i.e. a PTS Presentation Time Stamp, as an in point of the scene of step S332 to the real playlist loaded into the RAM 109.

In step S334, the microcomputer 107 generates a new virtual playlist in the RAM 109 as management information (attribute information) associated with the moving image for which recording was started in step S331 (in other words, the moving image being recorded). In step S335, the microcomputer 107 records the new scene in the virtual playlist in the RAM 109 generated in step S334, and records a first Ipicture PTS of the video data for which moving image recording was started in step S331 for the in point of that scene (attribute recording). After this, the processing proceeds to step S336. An Ipicture is one frame comprising in a GOP (Group of Pictures), and is a frame encoded without referencing another frame, and playback is possible with the data of such a frame alone. In step S336, the microcomputer 107, by controlling the OSD unit 105, displays to the display module and outputs to the external output 115 that a moving image is being recorded to both the real playlist and the virtual playlist (in other words, real recording and virtual recording are being executed).

Figure 9C:
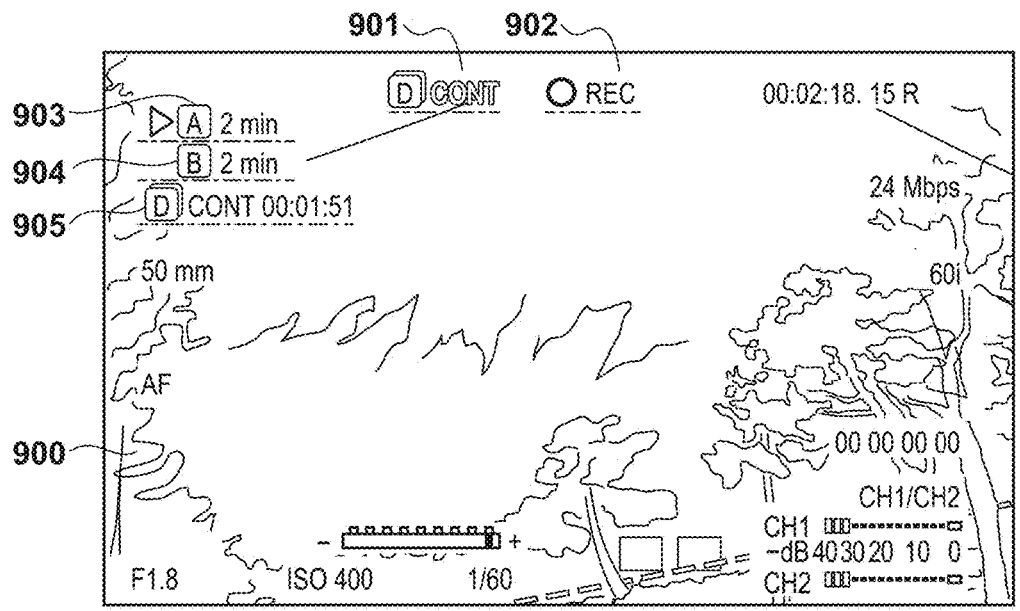

On FIG. 9C, a display example for a case where real recording is being performed and virtual recording is being performed in the continuous recording mode displayed in step S336 is shown. By displaying a display form of the mode status display 901 indicating that the continuous recording mode is on in a display form (for example, red) different to when in recording stand by (white), it is shown that the moving image is being recorded (real recording is being performed) in the real playlist. Also, by "●REC" being displayed in the REC status display 902, it is shown that a moving image is being recorded in the virtual playlist (virtual recording is being performed). Virtual recording is being performed means a state in which an in point is recorded in the virtual playlist during moving image recording to a memory card, and a corresponding out point is not recorded. In other words, it is a state in which the last to be recorded is not an out point but rather an in point.

Also, while not recording to the virtual playlist, the REC status display 902 is "STBY" not "●REC". While not recording to the virtual playlist, the state is such that a recording (a real recording) of the moving image to the memory cards is performed, but there does not exist an in point for which there is no matching out point in the virtual playlist. In other words, "while not recording to a virtual playlist" is a state in which only real recording is performed in the continuous recording mode, and virtual recording is not performed.

Furthermore, in the already recorded duration 905 in the virtual recording, the longer duration is displayed from out of the total duration of scenes of the virtual playlist of the memory card A 112, and the total duration of scenes of the virtual playlist of the memory card B 113 stored in the RAM 109. Because virtual recording is being performed in FIG. 9C, the duration is incremented continuously continuing with the recording time. For example, when virtual playlists having 1 minute and 51 seconds and 1 minute of scenes are recorded respectively in the memory card A 112 and the memory card B 113, the total duration of 1 minute and 51 seconds of the scenes of the virtual playlist of the memory card A 112 is displayed. In other words, the already recorded duration 905 in virtual recording is, in the state of FIG. 9C, the total time of durations from in points until out points of in point and out point sets which are already recorded in association with the moving image being recorded and a duration from when the last in point is recorded until a current time.

Step S337-step S349 show processing in which real recording is being performed and virtual recording is being performed in the continuous recording mode. In step S337, the microcomputer 107 determines whether or not the external recording control is set to on. In a case where the external recording control is set to be on, the processing proceeds to step S338, and in a case where the external recording control is not set to be on, the processing proceeds to step S339. In step S338, the microcomputer 107 outputs the external recording flag to the external output 115 and starts external recording. Details are the same as the processing explained in step S215.

In step S339, the microcomputer 107 determines whether or not the operator presses the status button 1708. In a case where it is determined that the status button 1708 is pressed, the processing proceeds to step S340, and in a case where it is determined that the status button 1708 is not pressed, the processing proceeds to step S341. In step S340, the microcomputer 107, by controlling the OSD unit 105, displays the status screen on the display module, and outputs to the external output 115. The displayed status screen is the same as the status screen (FIG. 10A) in step S305. However, in step S340, because both the real playlist and the virtual playlist are being recorded, both the playback total duration 1001 of the scene recorded to the real playlist and the playback total duration 1002 of the scene recorded to the virtual playlist are counted up.

In step S341, the microcomputer 107 determines whether or not the START/STOP button 1705 is pressed by the operator. In a case where it is determined that the START/STOP button 1705 is pressed, it is treated as a stopping of the virtual recording being instructed, and the processing proceeds to step S367. In a case where it is determined that the START/STOP button 1705 is not pressed, the processing proceeds to step S342. In step S342, the microcomputer 107 obtains a status of the memory card A 112 and of the memory card B 113, and determines if there is no more recordable capacity or if the lid of the card slot of the memory card is open for either of the memory cards. In addition, the above described conditions may be determined for step S328. In a case where the result of the determination in step S342 is YES, the processing proceeds to step S343, and in a case where the result of the determination is NO, the processing proceeds to step S360.

In step S343, the microcomputer 107 determines whether or not the operator made an instruction for opening a menu by operating the menu button 1707. In a case where an instruction for opening the menu is performed, the processing proceeds to step S350, and in a case where such an instruction is not performed, the processing proceeds to step S344. In step S344, the microcomputer 107 determines whether or not a mode switching is instructed with an operation on the power switch 1706 of the operator. In a case where a mode switching is instructed, the processing proceeds to step S347, and in a case where a mode switching is not instructed, the processing proceeds to step S345.

In step S345, the microcomputer 107 determines whether or not the operator performed another operation on the operation switch group 111. The other operation may be changing a setting parameter pertaining to image capturing, or changing a level of audio for example. In a case where another operation is performed, the processing proceeds to step S346, and processing suitable to the content of the setting change is performed. In a case where another operation is not performed, the processing returns to step S337.

In step S347, in order to leave the image capturing mode, the microcomputer 107 performs processing for a recording suspension of the scene being recorded. More specifically, firstly, the microcomputer 107 records an out point which complements the in point of the recorded scene to the virtual playlist in the RAM 109. Note, the out point is the Ipicture PTS immediately after step S344 (immediately after the mode switching instruction occurred). In step S348, the microcomputer 107 determines whether or not the external recording control is set to on. In a case where the external recording is set to on, the processing proceeds to step S349, and the microcomputer 107 puts the flag, which indicates that external recording is being performed and is being output to the external output 115, into an external recording suspended state (external recording is stopped). After this, the processing proceeds to step S390.

Meanwhile, in a case where it is determined that an instruction for opening the menu is made in step S343, the processing proceeds to step S350. Step S350-step S359 is menu processing performed while executing real recording and virtual recording. In step S350, the microcomputer 107, by controlling the OSD unit 105, displays the menu to the display module and outputs the menu to the external output 115. This is equivalent to the processing explained in step S214. In step S351, the microcomputer 107 determines whether or not an operation for making a setting change is performed in the menu displayed in step S350. In a case where it is determined that a setting change operation is performed, the processing proceeds to step S352, and in a case where it is determined that a setting change operation is not performed, the processing proceeds to step S359. In step S352, the microcomputer 107 records the setting after the change that operator makes with an operation on the menu as backup information in the ROM 108.

In step S353, the microcomputer 107 determines whether continuous recording is set to be stopped by a continuous recording start/stop item being selected on the menu (in other words, not by the START/STOP button 1705 being pressed). In a case where a continuous recording stop is set, the processing proceeds to step S362, and in a case where the continuous recording stop is not set, the processing proceeds to step S354. In step S354, the microcomputer 107 determines whether the operator performed a setting of the external recording control by an operation on the menu. In a case where a setting of the external recording control is performed, the processing proceeds to step S355, and in a case where a setting of the external recording control is not performed, the processing proceeds to step S358.

In step S355, the microcomputer 107 determines whether or not the setting of the external recording control set in step S354 is on. In a case where the setting of the external recording control is on, the processing proceeds to step S357, and in a case where the setting of the external recording control is off, the processing proceeds to step S356. In step S356, the microcomputer 107 sets the external recording to an off state, and advances the processing to step S359. In step S357, the microcomputer 107 sets the external recording to an on state, and advances the processing to step S359. In step S358, the microcomputer 107 performs processing in accordance with another menu operation, and advances the processing to step S359.

In step S359, the microcomputer 107 receives an operation of the operation switch group 111 of the operator, and determines whether or not an operation for closing the menu is performed. In a case where it is determined that an operation for closing the menu is performed, the microcomputer 107, by controlling the OSD unit 105, performs processing for ending the menu display displayed on the display module, and the menu display output to the external output 115, and the processing proceeds to step S344. In a case where it is determined that an operation for closing the menu is not performed, the processing returns to step S351.

Figure 16A:
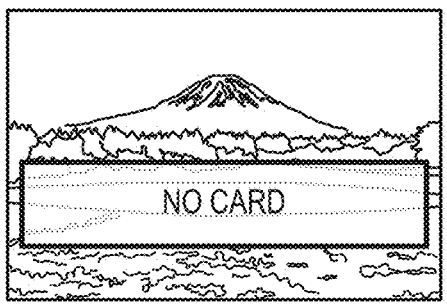
FIGS. 16A-16E are views for representing alerting screens.
Figure 16B:
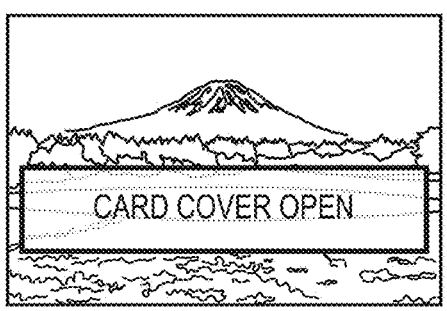
Figure 16C:
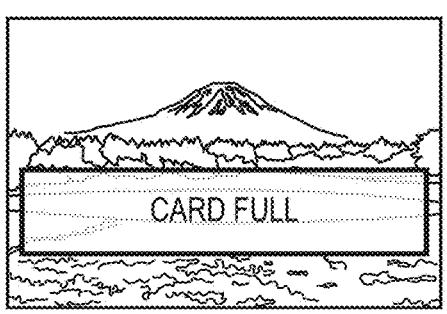

Also, in step S342, in a case where it is determined that the recordable capacity of at least one of the memory cards has run out, or in a case where it is determined that the lid of the card slot of at least one of the memory cards is open, the processing proceeds to step S360. In step S360-step S366, stopping of the real recording and the virtual recording is performed. Firstly, in step S360, the microcomputer 107, by controlling the OSD unit 105, displays a warning that recording cannot be performed to the display module, and performs similar display output to the external output 115. FIG. 16B and FIG. 16C are examples of this warning display. In step S361, the microcomputer 107, by controlling the OSD unit 105, performs a continuous recording impossible display to the display module and the external output 115. Here, the display content is the same as the content explained in step S340 (FIG. 10A).

In step S362, the microcomputer 107 records to the virtual playlist in the RAM 109 an out point that complements the in point of the scene recorded step S335. Note, the out point is the Ipicture PTS immediately after "NO" is determined in step S342 (immediately after the card became full or the card lid was opened), or immediately after "YES" is determined in step S353 (immediately after stopping of continuous recording is set in the menu). In step S363, the microcomputer 107 determines whether or not the external recording is set to on. In a case where external recording is set to be on, the processing proceeds to step S364, and if external recording is set to be off, the processing proceeds to step S365. In step S364, the microcomputer 107 sets the flag which indicates that external recording is being performed and was being output to the external output 115 to an external recording suspended state, and outputs the flag (stops the external recording). Note, in step S321 and step S353, configuration may be taken such that starting and stopping operations for continuous recording from the menu (start and stop real recording in the continuous recording mode), can be performed by an operation switch other than the START/STOP button 1705 without opening the menu.

In step S365, the microcomputer 107 stops the recording operation started in step S331, and records the PTS of the stopped frame in the real playlist loaded into the RAM 109 as the out point complementary to the in point recorded in step S333. Here, the out point may be the same as the out point recorded in the virtual playlist in step S362. In step S366, file closing processing for the moving image file of the moving image for which recording is stopped in step S365 is performed. Also, the real playlist and the virtual playlist stored in the RAM 109 are written to either the memory card A 112, the memory card B 113, or both. The virtual playlist is recorded in the same directory as the moving image file of the moving image for which the recording stopped. With this, even in a case where the memory card is referenced afterwards, the virtual playlist and the moving image file can be treated as being associated.

Meanwhile, step S367-step S391 is processing for a case in which YES is determined in step S341, i.e. it is processing for when a virtual recording is stopped (real recording is not stopped) due to the START/STOP button 1705 being pressed while a virtual recording is being performed. In step S367, the microcomputer 107 records to the virtual playlist in the RAM 109 an out point that complements the in point of the scene recorded step S335. Note, the out point is the Ipicture PTS immediately after YES is determined in step S341 (immediately after the START/STOP button 1705 is pressed while virtual recording is being performed). In step S368, the microcomputer 107, by controlling the OSD unit 105, displays that the virtual recording is stopped during continuous recording on the display module. Also, the same display is output to the external output 115.

Figure 9D:
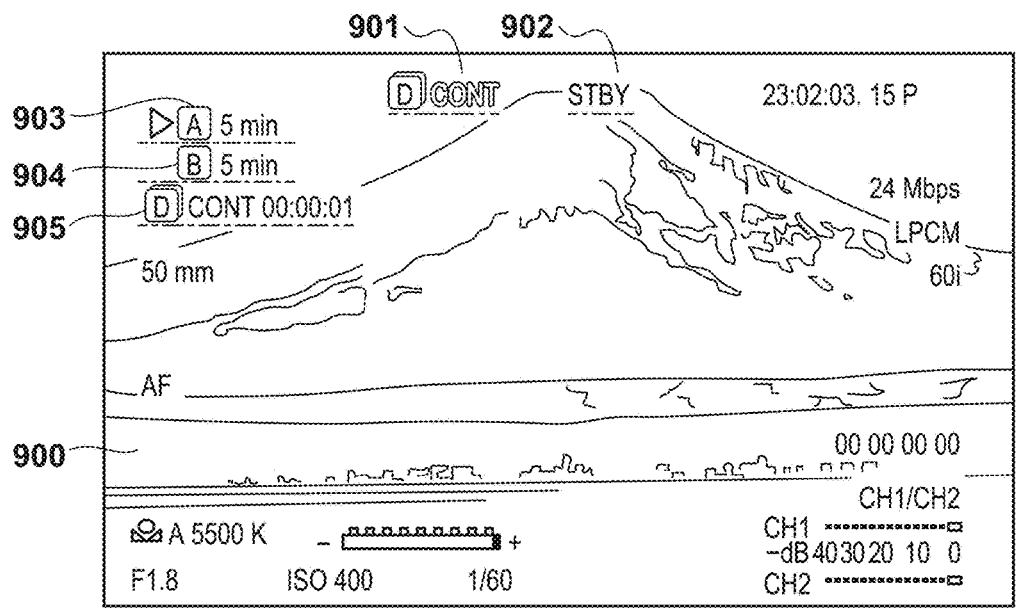

In FIG. 9D, a display example of a case in which the continuous recording mode is on, real recording is being performed, and virtual recording is stopped, which is displayed in step S368, is shown. Because real recording is being performed, the character string "CONT" of the mode status display 901 is displayed in red, but because virtual recording is stopped, the REC status display 902 is displayed as "STBY". By looking at these, the user is able to understand that current operation state is a state in continuous recording mode where real recording is being performed, but virtual recording is not being performed. In this state, in a case where a plurality of sets of in points and out points are already recorded in the virtual playlist (in association with the moving image being recorded), the already recorded duration 905 in the virtual recording is a total time of durations of the plurality of sets from the in points to the out points.

In step S369, the microcomputer 107 determines whether or not the external recording is turned on. In a case where the external recording is turned on, the processing proceeds to step S370, and in a case where the external recording is not turned on, the processing proceeds to step S371. In step S370, the microcomputer 107 set the flag which indicates that external recording is being performed and was being output to the external output 115 to an external recording suspended state, and outputs the flag. In this way, external recording can be stopped in coordination with recording of the out point of the virtual playlist. In this way, the external recording is executed in coordination with the virtual recording (in point/out point of the virtual playlist) rather than the recording of the real playlist.

Figure 16D:
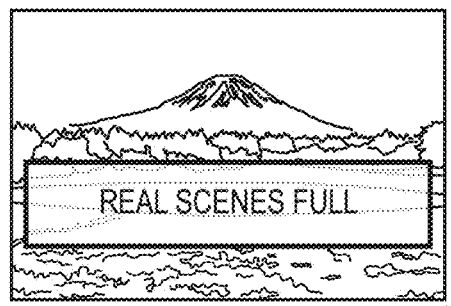
Figure 16E:
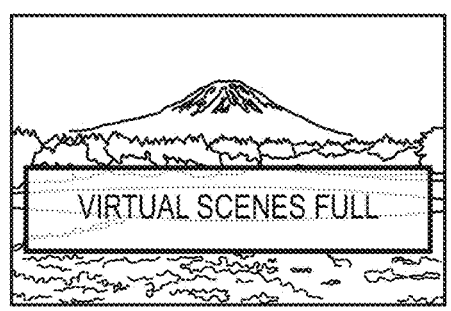

Next, in step S371, the microcomputer 107 determines whether the number of scenes in the virtual playlist loaded into the RAM 109 is at an upper limit. In a case where the number of scenes has reached the upper limit, the processing proceeds to step S372, and in a case where the number of scenes has not reached the upper limit, the processing proceeds to step S373. Note, the upper limit of the number of scenes is made to be 950 scenes in this embodiment, but the upper limit is not limited to this. In step S372, the microcomputer 107 outputs a warning display that the upper limit of virtual recording is reached to the display module by controlling the OSD unit 105. Also, the same display is output to the external output 115. An example of the warning screen output in step S372 is shown in FIG. 16E.

In step S373, the microcomputer 107 determines whether the operator presses the START/STOP button 1705. In a case where the START/STOP button 1705 is pressed, the processing returns to step S335, an in point is recorded in the virtual playlist, and a new virtual recording is started. In a case where it is determined that the START/STOP button 1705 is not pressed, the processing proceeds to step S374.

Figure 10B:
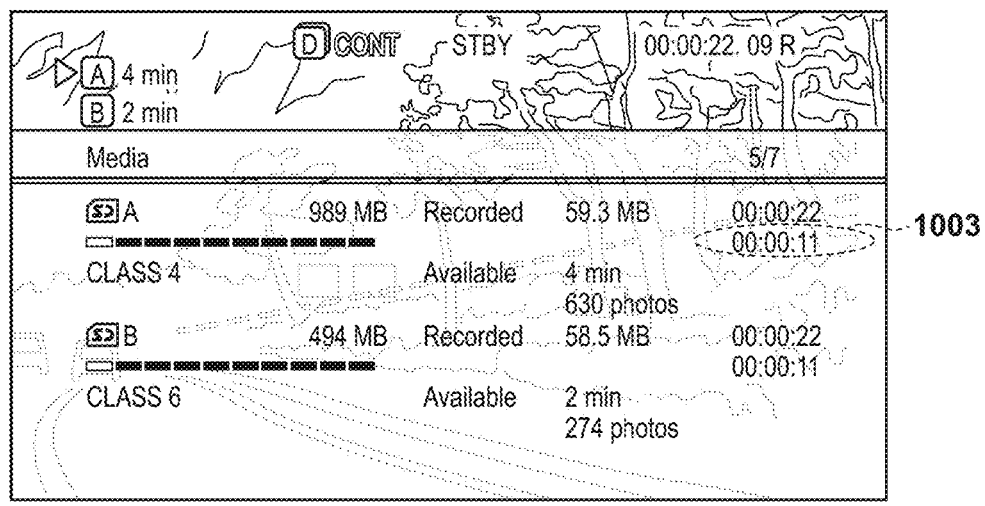

In step S374, the microcomputer 107 determines whether or not the operator presses the status button 1708. In a case where it is determined that the status button 1708 is pressed, the processing proceeds to step S375, and in a case where it is determined that the status button 1708 is not pressed, the processing proceeds to step S376. In step S375, the microcomputer 107, by controlling the OSD unit 105, displays the status screen on the display module. Also, the same display is output to the external output 115. In FIG. 10B, a display example of the status screen in a state in which the continuous recording mode is on, and only the real recording is performed (the virtual recording is not performed) displayed in step S375 is shown. Because only the real playlist is being recorded, only numeral 1003, which denotes the recording time of the real playlist, is being counted up.

In step S376, the microcomputer 107 obtains a status of the memory card A 112 and of the memory card B 113 and determines whether or not there is no remaining recordable capacity (whether or not the card is full). In a case where there is no remaining recording capacity, the processing proceeds to step S365, and in a case where there is recording capacity, the processing proceeds to step S377. In step S377, the microcomputer 107 determines whether or not the operator made an instruction for opening the menu to the image recording apparatus 100 by operating the operation switch group 111. In a case where an instruction for opening the menu is performed, the processing proceeds to step S378, and in a case where an instruction for opening the menu is not performed, the processing proceeds to step S389.

In step S378, the microcomputer 107, by controlling the OSD unit 105, performs display processing to display the menu to the display module, and the external output 115. The display processing is equivalent to that of step S214. In step S379, the microcomputer 107 determines whether or not an operation for making a setting change is performed in the menu displayed in step S378. In a case where a setting change operation is performed, the processing proceeds to step S380, and in a case where a setting change operation is not performed, the processing proceeds to step S387. In step S380, the microcomputer 107 records the setting after the change that operator makes in step S378 as backup information in the ROM 108.

In step S381, the microcomputer 107 determines whether or not the executed setting change operation is an external recording control setting change. In a case where the executed setting change operation is an external recording control setting change, the processing proceeds to step S382, and in a case where the executed setting change operation is not an external recording control setting change, the processing proceeds to step S385. In step S382, the microcomputer 107, with reference to the backup information recorded in step S378, determines whether or not the setting of the external recording control is on. In a case where the setting of the external recording control is on, the processing proceeds to step S384, and in a case where it is off, the processing proceeds to step S383. In step S383, the microcomputer 107 sets external recording to an off state. Meanwhile, in step S384, the microcomputer 107 sets external recording to an on state.

In step S385, the microcomputer 107 determines whether or not the executed setting change operation is an operation for setting continuous recording to be stopped. In a case where an operation for setting continuous recording to be stopped is performed, the processing proceeds to step S365, and when that is not the case the processing proceeds to step S386. In step S386, the microcomputer 107 receives an operation of the operation switch group 111 made by the operator, and performs other menu processing.

In step S387, the microcomputer 107 receives an operation of the operation switch group 111 of the operator, and determines whether or not an operation for closing the menu is performed. In a case where it is determined that an operation for closing the menu is not performed, the processing returns to step S379. Meanwhile, in a case where it is determined that an operation for closing the menu is performed, the microcomputer 107, by controlling the OSD unit 105, performs processing for ending the menu display displayed on the display module, and output to the external output 115, and the processing proceeds to step S389.

In step S389, the microcomputer 107 determines whether or not a mode switching is instructed with an operation on the operation switch group 111 by the operator. In a case where it is determined that mode switching is instructed, the processing proceeds to step S390, and the real recording currently executing is stopped. In a case where it is determined that mode switching is not instructed, the processing proceeds to step S392. In step S390, the microcomputer 107 stops the recording operation started in step S331, and records the PTS of the stopped frame in the real playlist loaded into the RAM 109 as the out point complementary to the in point recorded in the real playlist in step S333. In step S391, the microcomputer 107 writes the real playlist and the virtual playlist stored in the RAM 109 to either the memory card A 112, the memory card B 113, or both.

In step S392, the microcomputer 107 determines whether the operator made another main body operation on the image recording apparatus 100 by operating the operation switch group 111. In a case where it is determined that another main body operation is performed, the processing proceeds to step S393, and in a case where it is determined that another main body operation is not performed, the processing proceeds to step S373. In step S393, the microcomputer 107 changes the image recording apparatus 100 to be in the state that the operator operated in step S392. After this, the processing returns to step S373.

Note, in the explanation up until this point, the operation was assumed to be for when external recording is set to be on during continuous recording, and external recording is performed in coordination with recording of the virtual playlist, but configuration may be taken such that real playlist recording starting/stopping are coordinated with the external recording.

Figure 4A:
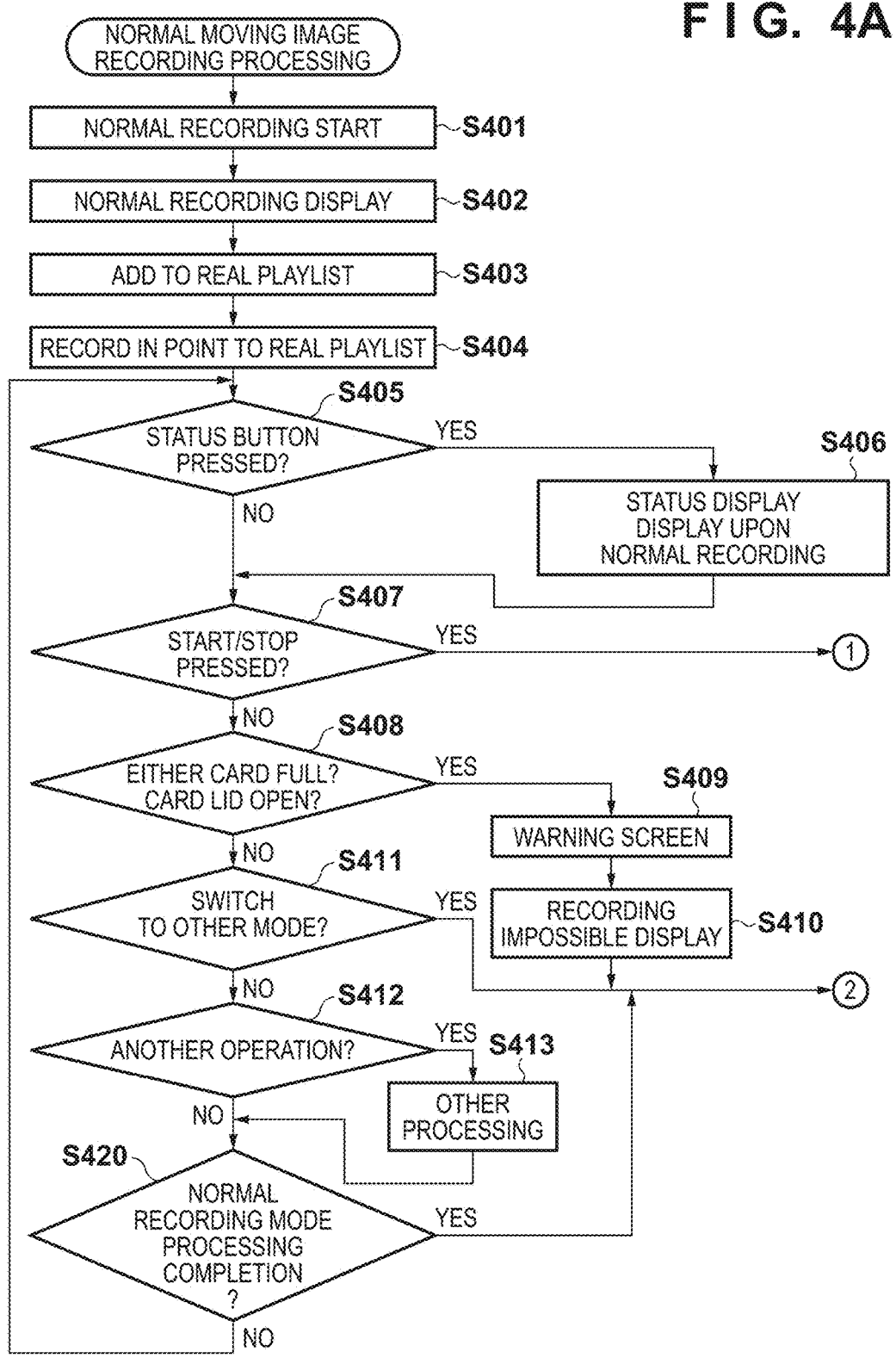
FIGS. 4A and 4B are flowcharts for showing continuous recording processing of present embodiments.
Figure 4B:
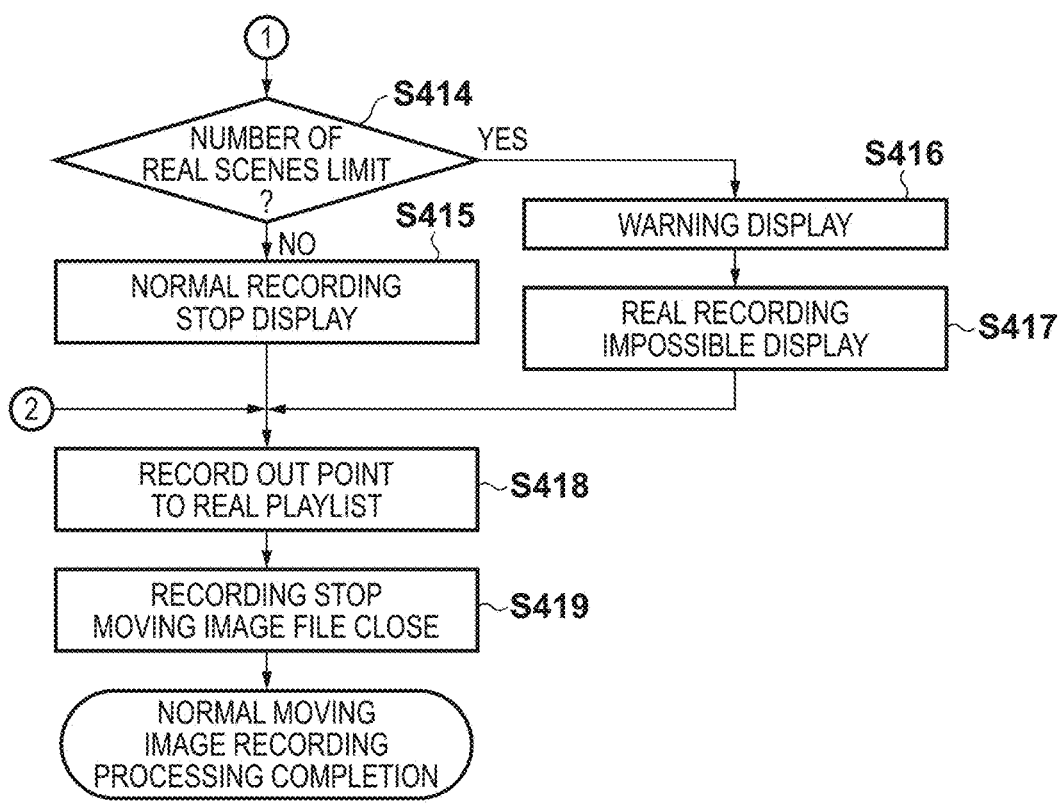

FIG. 4A and FIG. 4B are flowcharts for showing details of moving image recording processing in a case where in previously described step S212 of FIG. 2B, the continuous recording mode is turned off, i.e. in the normal recording mode. The processing shown in this flowchart is realized by the microcomputer 107 comprised in the image recording apparatus 100 executing a program stored in the ROM 108, for example. Normal moving image recording processing is recording processing in which only real playlist recording is performed, and virtual play list recording is not performed.

When, in the normal recording mode, the START/STOP button 1705 is operated, and the moving image recording processing is started (step S203, step S212), real recording (normal recording) in the normal recording mode is started in step S401. In this processing, in accordance with an operation of the START/STOP button 1705, an instruction is output for starting recording internally in the image recording apparatus 100. In this recording operation, light that the lens unit 101 collects is photo electrically converted by the CCD 102, and the output of this being signal processed by the camera signal processing unit 103 is compressed by the compression/decompression circuit 104, and recorded in the memory card A 112 and the memory card B 113 by the recording playback circuit 110.

Figure 7B:
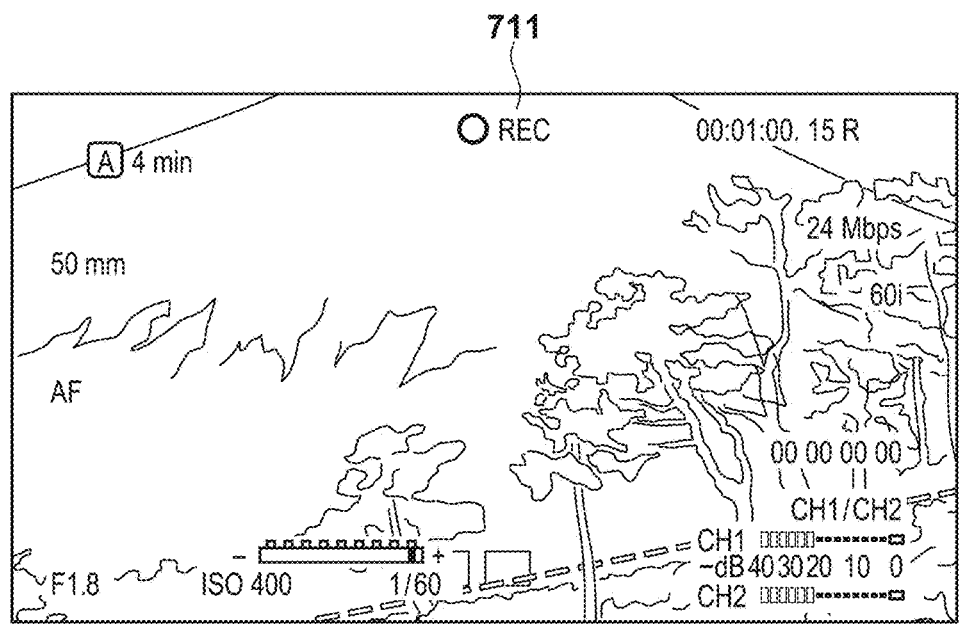

Also, in step S402, the microcomputer 107 performs a screen display representing that normal recording is performed on the display module. This display example is shown in FIG. 7B. A REC status display 711 is different from the display during the continuous recording mode which indicates whether or not virtual recording is being performed, and rather indicates whether or not being recording is being performed to the real playlist. When recording is being performed to the real playlist, the REC status display 711 is displayed as "●REC", and when recording is not being performed, "STBY" is displayed.

Continuing on, in step S403, the microcomputer 107 adds a scene to the real playlist loaded into the RAM 109. Then, in step S404, the microcomputer 107 records the PTS of the first frame of the moving image data that starts the recording in step S401 to the real playlist as the in point of the added scene. In step S405, the microcomputer 107 determines whether or not the status button 1708 is pressed. When the status button 1708 is pressed, the microcomputer 107, in step S406, performs a display of the status screen when normal recording (real recording in the normal recording mode) is performed. The display here is similar to the status screen explained in step S205 (FIG. 7A).

In step S407, the microcomputer 107 determines whether the START/STOP button 1705 is pressed. When it is determined that the START/STOP button 1705 is pressed, the processing proceeds to step S414 in order to perform real recording stopping processing. In step S414, the microcomputer 107 confirms whether or not the number of real scenes has reached an upper limit. In a case where it is confirmed that the number of real scenes has reached the upper limit, the processing proceeds to step S416, and the microcomputer 107 performs a warning display indicating that the number of real scenes has reached the upper limit on the display module. Then, in step S417, the microcomputer 107 displays a screen indicating that no more real scenes can be recorded. An example of the warning display is shown in FIG. 16D.

Continuing on, in step S418, the microcomputer 107 records an out point corresponding to the in point recorded in step S404 to the real playlist. In step S419, the microcomputer 107 performs closing processing for the moving image file for which recording is started in step S401, records the real playlist loaded into the RAM 109 into the memory card A 112 and the memory card B 113, and ends this processing. Note, the out point recorded in step S418 is the PTS of a final frame of the moving image file for which recording ends in step S419. Meanwhile, in a case where it is determined, in step S414, that the real scene upper limit has not been reached, the processing proceeds to step S415, and the microcomputer 107 displays a display screen indicating that the normal recording stopped. Then, as described above, the microcomputer 107 records the out point in the real playlist (step S418), performs moving image file closing processing, and writing out to the memory card of the playlist (step S419), and ends this processing.

In a case where in step S407 it is determined that the START/STOP button 1705 is not pressed, the processing proceeds to step S408, and the microcomputer 107 confirms whether either of the recording target media are at full capacity, and that their card lids are not open. In a case where either of the conditions matches in step S408, the microcomputer 107 performs a display of a corresponding warning screen in step S409, and in step S410, performs a display to the display module of a warning screen indicating that recording cannot be performed. Examples of the warning screen here are shown in FIG. 16A and FIG. 16B. After that, the microcomputer 107 records the out point to the real playlist (step S418), performs moving image file closing processing and writing out to the memory card of the real playlist (step S419), and this processing ends.

In a case where in step S408 the determination is negative, the processing proceeds to step S411, and the microcomputer 107 determines whether or not an operation is performed for switching to another operation mode. When an operation is performed for switching to another operation mode, the processing of step S418 and step S419 described above is executed in order to stop recording of the moving image forcibly. Meanwhile, in a case where switching to another operation mode is not detected in step S411, the microcomputer 107 determines whether or not there was another operation in step S412. In a case where it is determined that another operation occurred, the processing proceeds to step S413, and the microcomputer 107 performs corresponding processing. In step S420, the microcomputer 107 performs a determination of whether or not an event for completing normal recording mode processing such as a battery remaining capacity reduction occurs, and in a case where an event for completing the normal recording mode processing occurs, the processing proceeds to step S418, and when that is not the case the processing proceeds to step S405. In a case where an event that completes the normal recording mode processing occurs, the normal moving image recording processing completes.

Figure 3A:
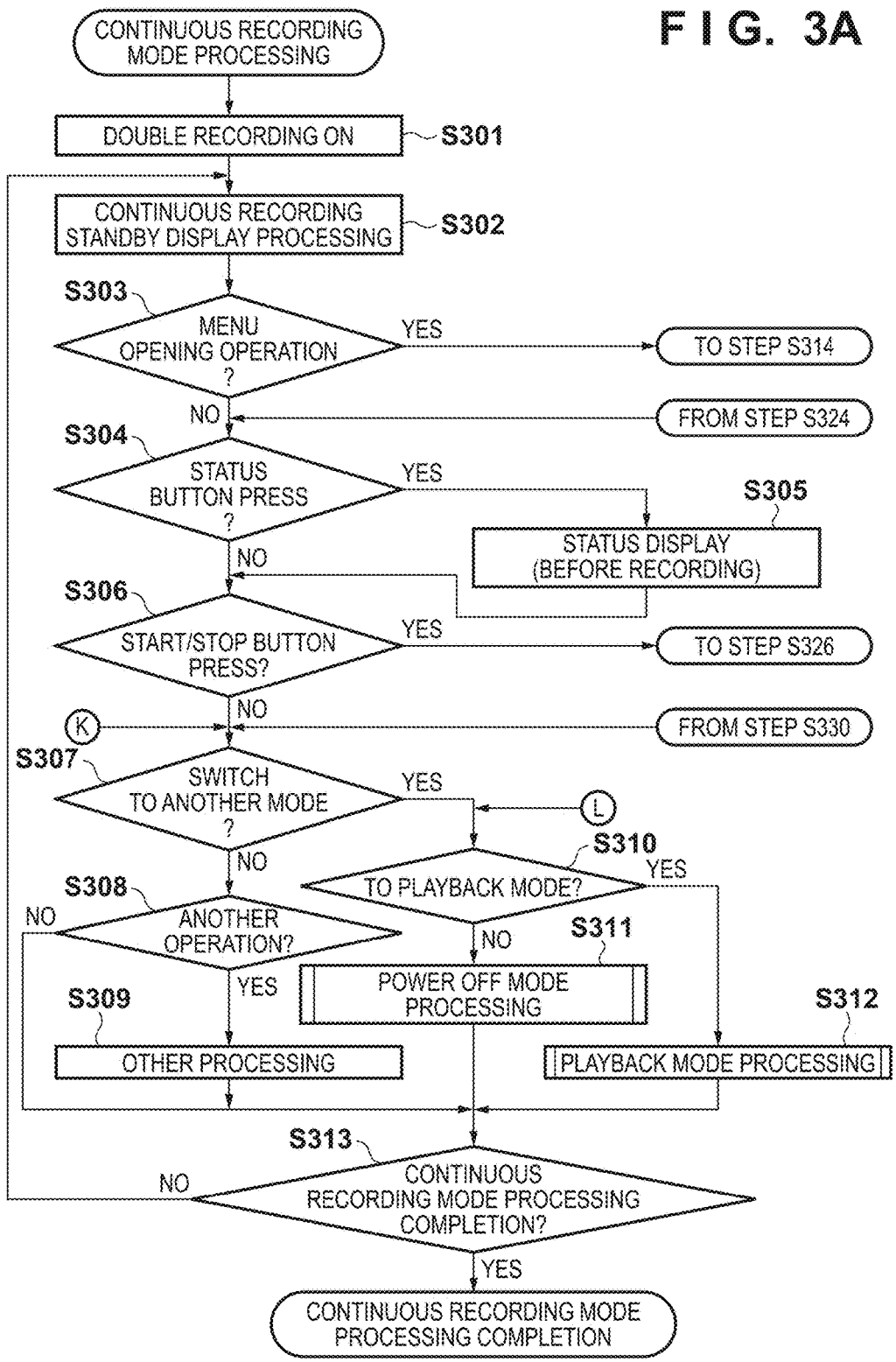
Figure 3C:
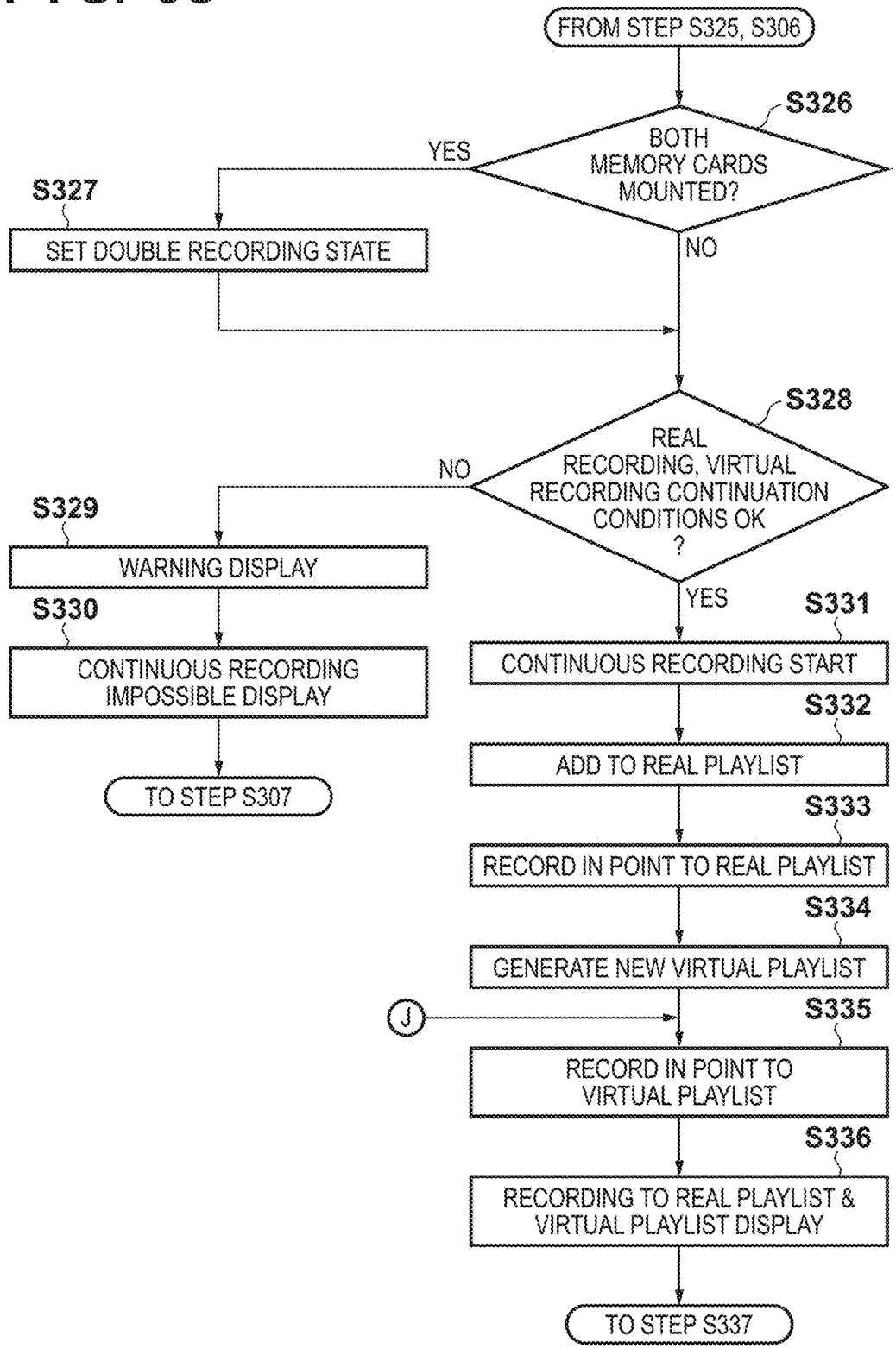
Figure 3D:
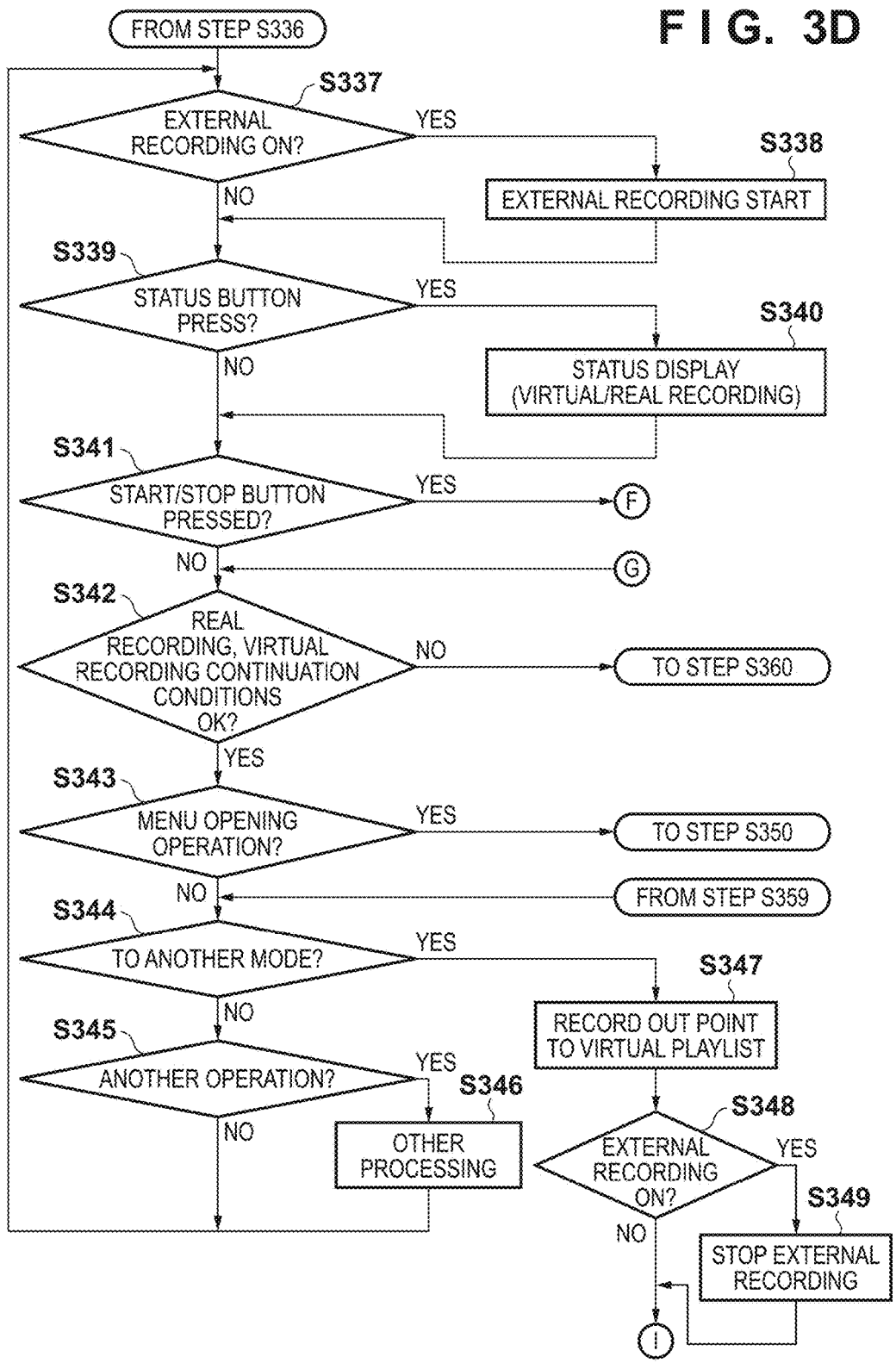
Figure 3E:
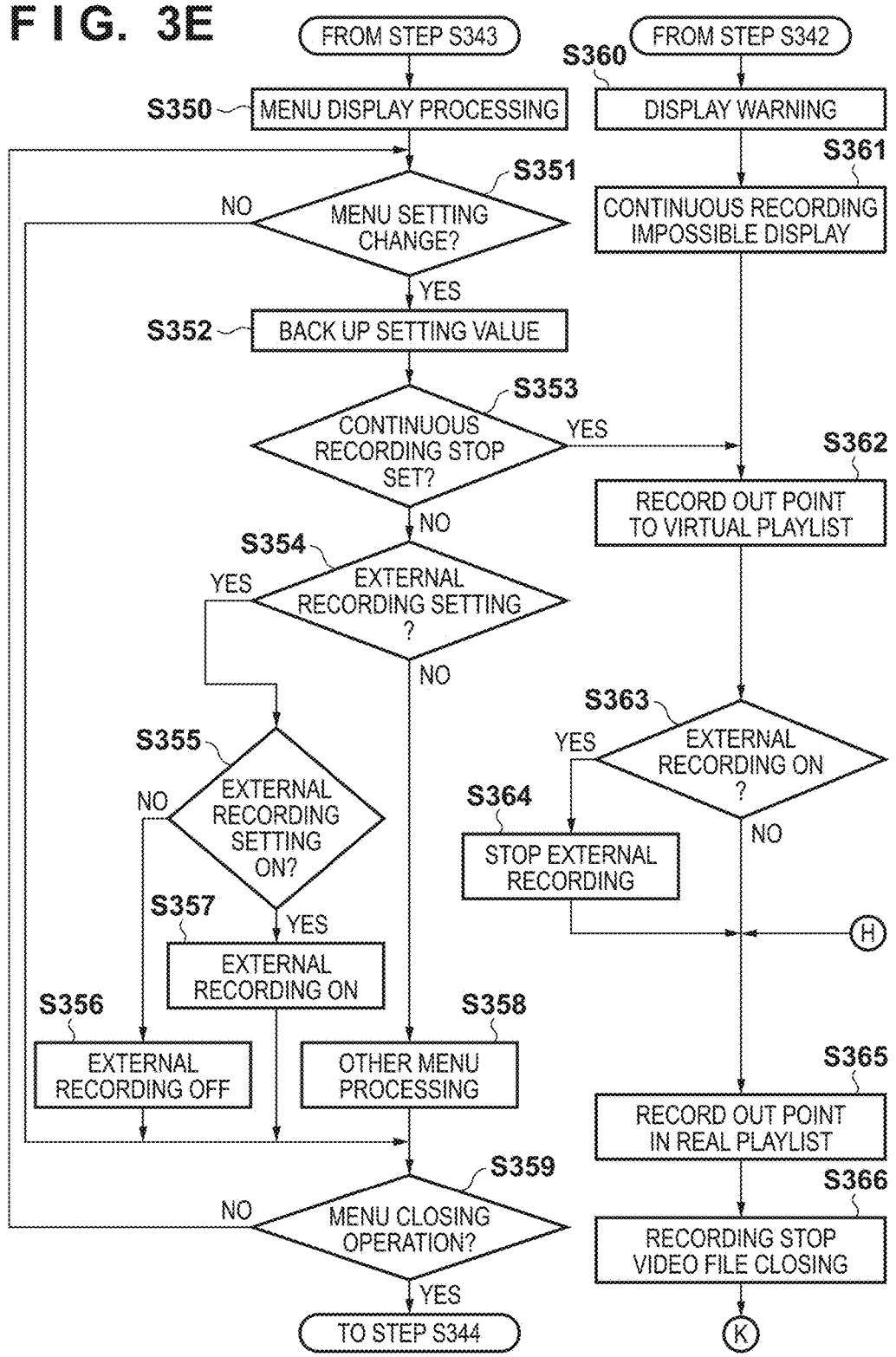
Figure 3F:
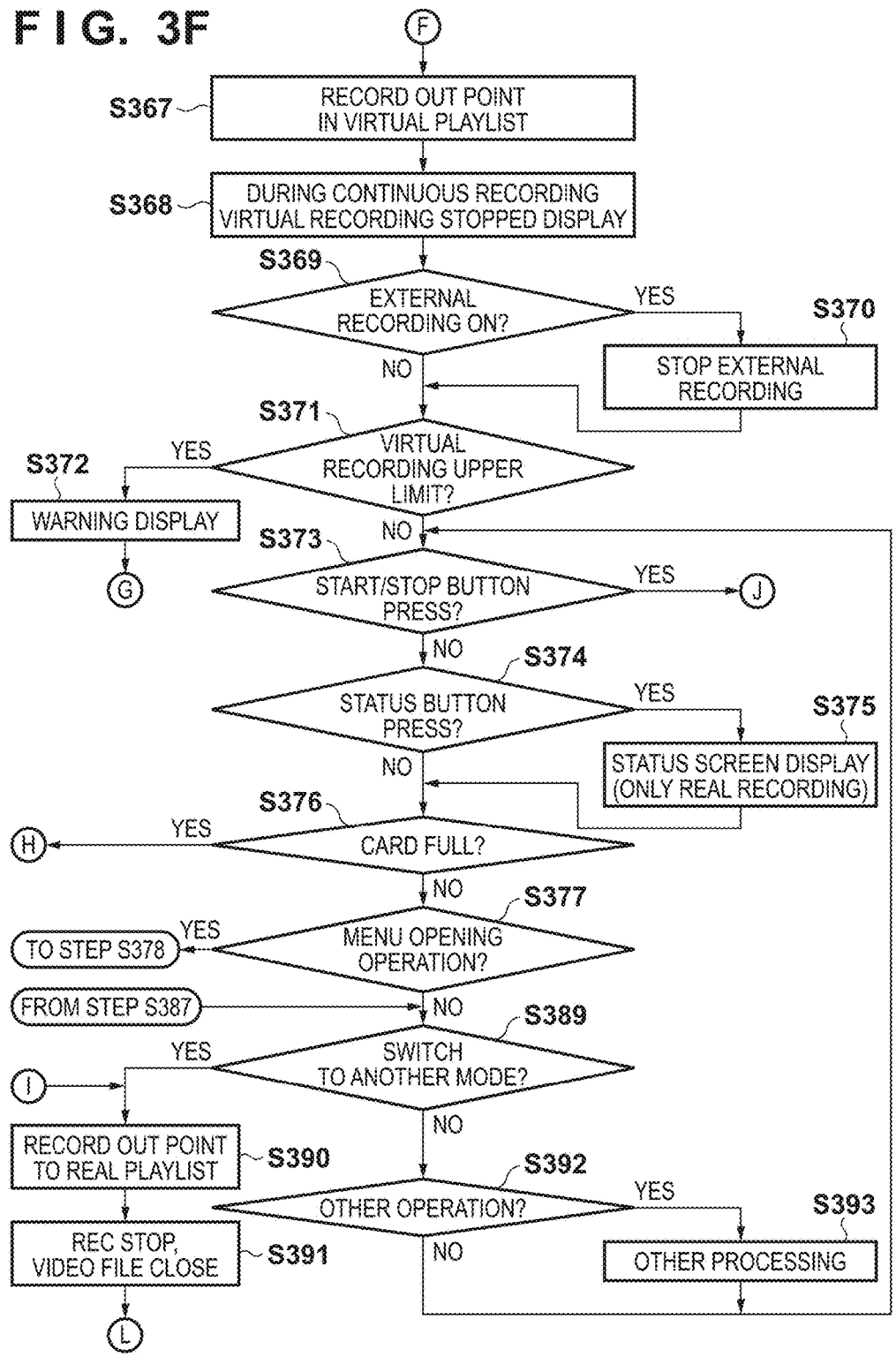
Figure 3G:
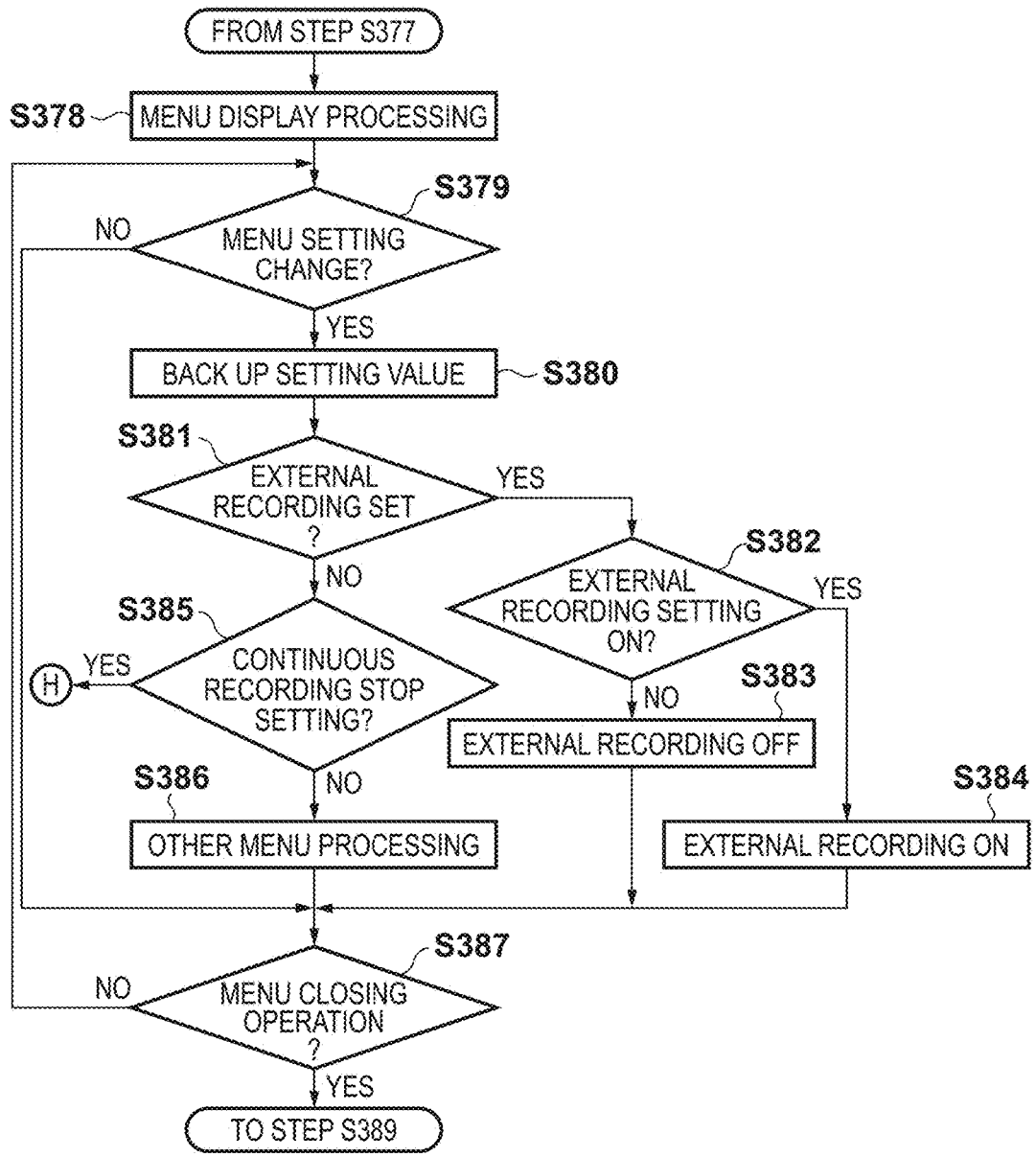
Figure 5A:
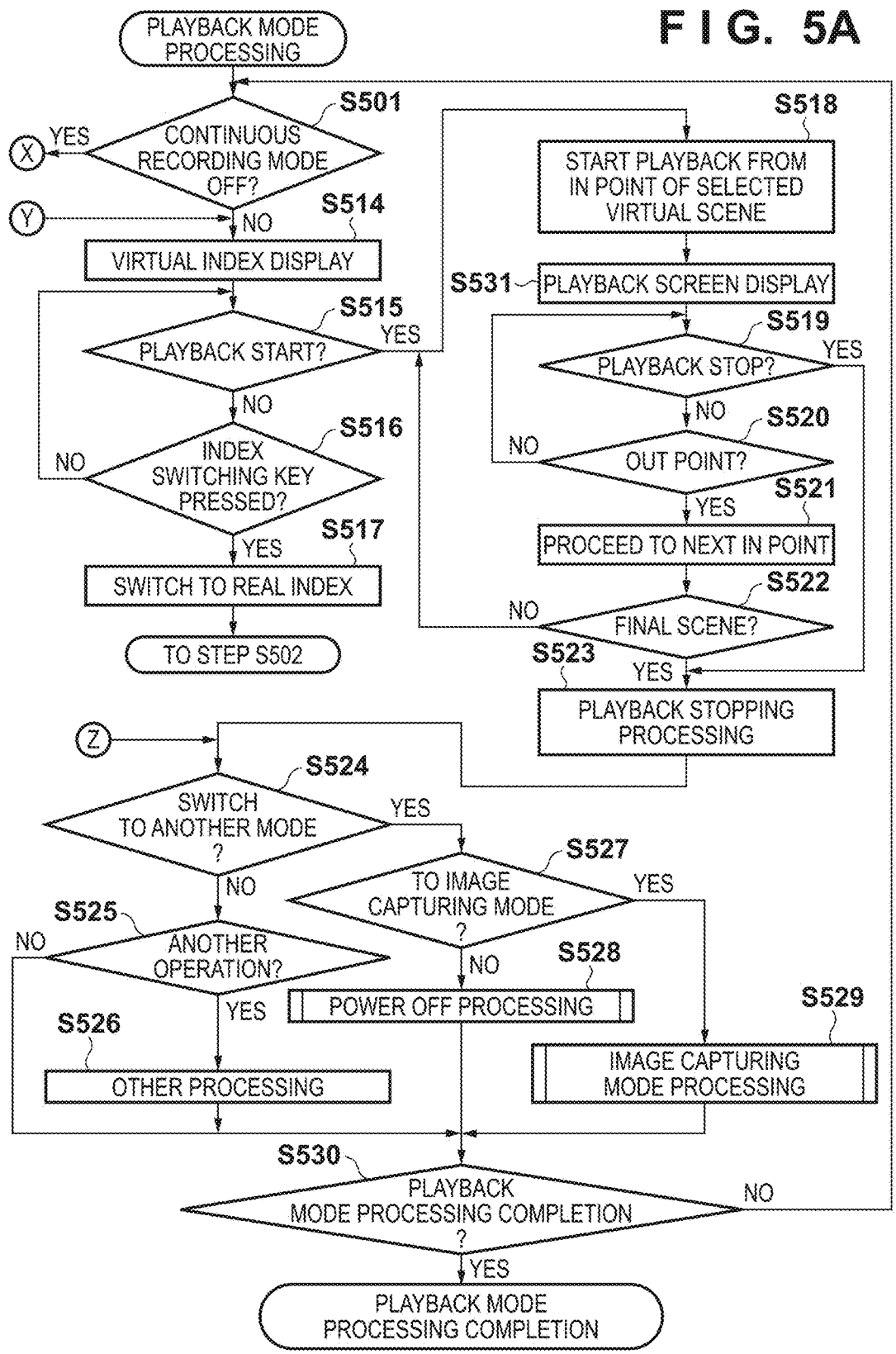
FIGS. 5A and 5B are flowcharts for showing playback processing of present embodiments.
Figure 5B:
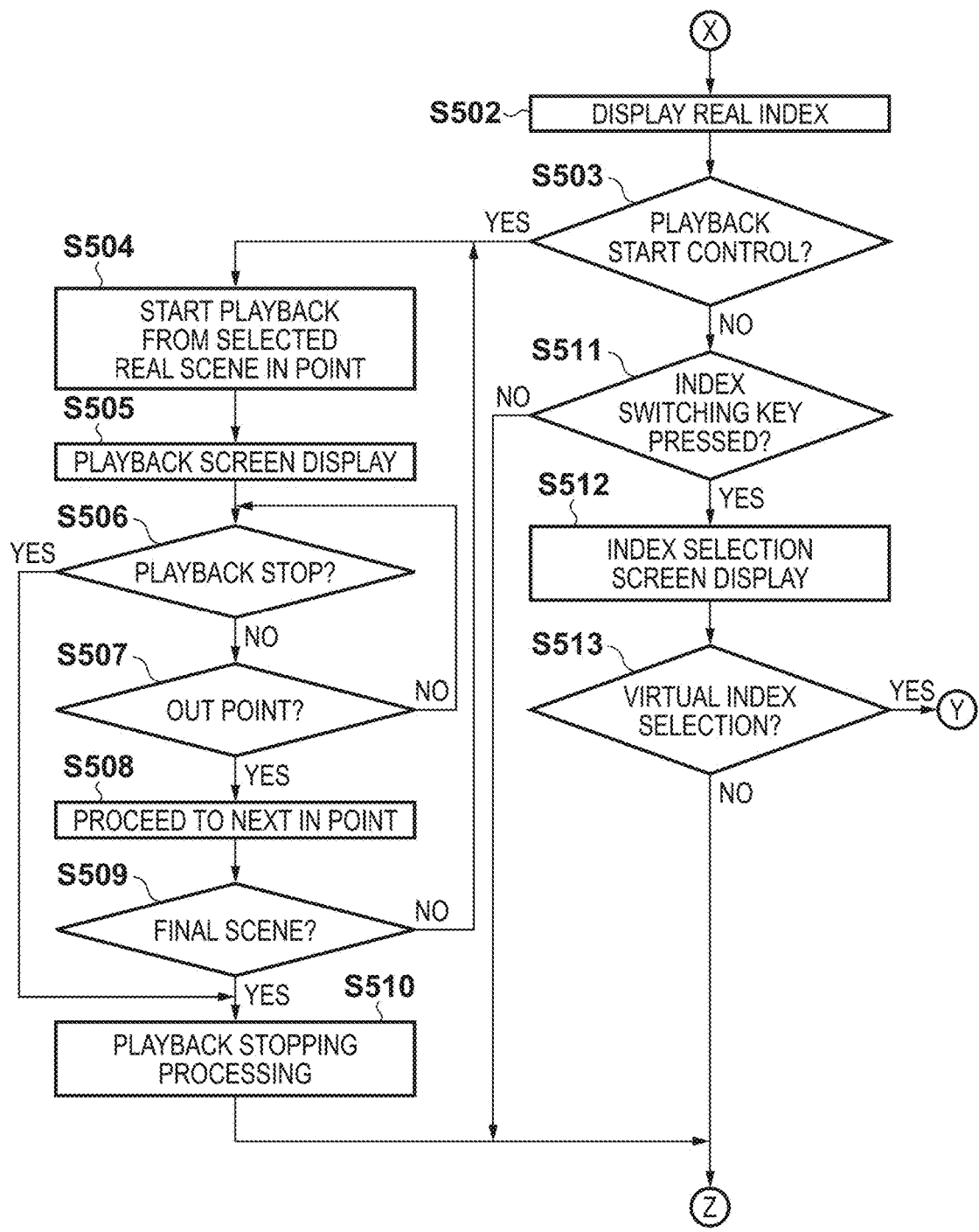

FIGS. 5A-5B are flowcharts for playback mode processing in step S211 of the previously described FIG. 2B, and step S312 of FIG. 3A. The processing shown in this flowchart is realized by the microcomputer 107 comprised in the image recording apparatus 100 executing a program stored in the ROM 108, for example.

When the playback mode processing is entered, the microcomputer 107 checks whether or not a setting of a continuous recording mode is off in step S501. In a case where the continuous recording mode is off, the processing proceeds to step S502, and the microcomputer 107 displays a real index screen. A real index is a screen for displaying a list of scenes recorded in the real playlist.

Figure 11A:
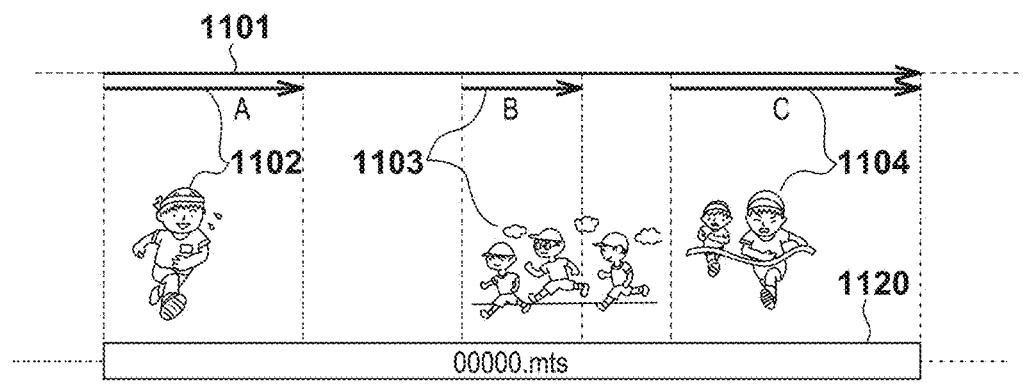
FIGS. 11A-11C are views for explaining index screens.

Here, explanation will be given for a real index and a virtual index providing an example for a case in which recording is executed as shown in FIG. 11A. A scene 1101 is a scene recorded in the real playlist. A scene 1102, a scene 1003, and a scene 1104 are scenes recorded in the virtual playlist. An Ipicture proximal to an in point of the scene 1101 recorded in the real playlist is decoded by the compression/decompression circuit 104, and displayed as a thumbnail in the real index. Meanwhile, an Ipicture proximal to an in point of each of the scenes 1102-1104 recorded in the virtual playlist is decoded by the compression/decompression circuit 104 and displayed as a thumbnail in the virtual index. A moving image file 1120 shows a time period of a moving image included in a moving image file generated accompanying the real recording.

Figure 11B:
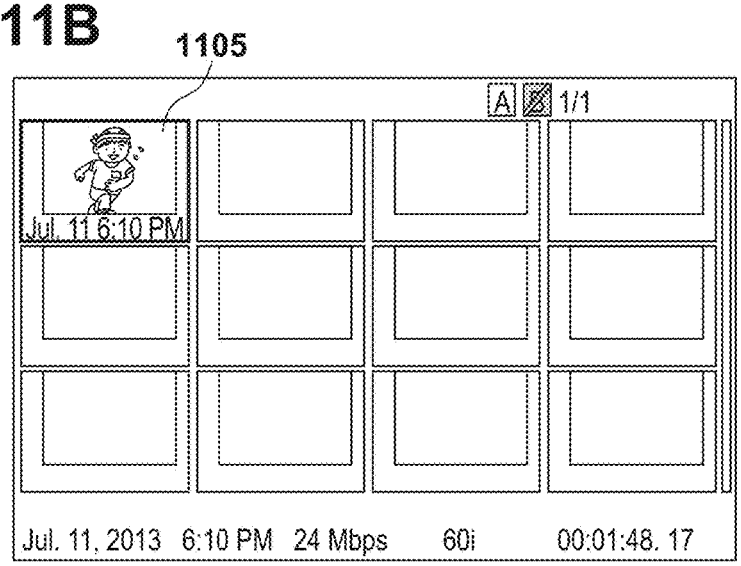

An example of a screen of a real index corresponding to the scene 1101 of the real playlist of FIG. 11A is shown in FIG. 11B. The real index is a list screen of representative images of the moving images each of which is recorded from a recording start to a recording end (recorded in a one time moving image recording), which each of the in points and out points of the real playlist recorded in the memory cards indicate. In the real index, as with a thumbnail 1105, a representative image of a scene that was real recorded is displayed. In other words, the thumbnail 1105 is a representative image in a case where the moving image recorded from the recording start to the recording end (recorded in a one time moving image recording) is treated as a single unit.

Figure 11C:
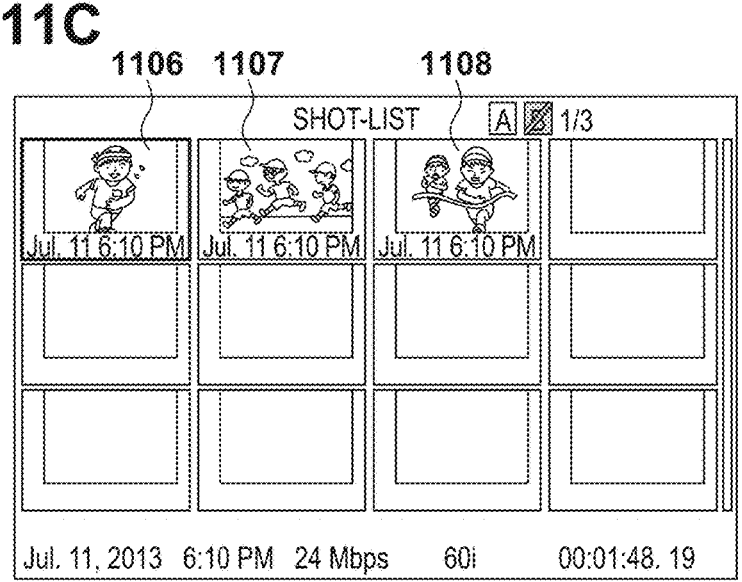

Also, an example of a screen of a virtual index corresponding to the virtual playlist to which the scenes 1102-1104 of FIG. 11A are recorded is shown in FIG. 11C. The virtual index is a list screen of representative images of scenes indicated by in points and out points of the virtual playlist associated with a single moving image recorded from the recording start until the recording end (recorded in a one time moving image recording). In the virtual index, because three scenes are recorded in the virtual playlist of FIG. 11A, the images of the in points of the three scenes are displayed as shown in thumbnails 1106-1108. In other words, the thumbnail 1106 is a representative image in a case where the scene 1102, indicated by a set of an in point and an out point recorded in the virtual playlist, is treated as a single moving image unit. Similarly, the thumbnail 1107 is an image for representing the virtually recorded scene 1103, which is a portion of the scene 1101 which is from the start to the end of the real recording of the moving image. Similarly, the thumbnail 1108 is an image for representing the virtually recorded scene 1104, which is a portion of the scene 1101 which is from the start to the end of the real recording of the moving image.

Figure 12A:
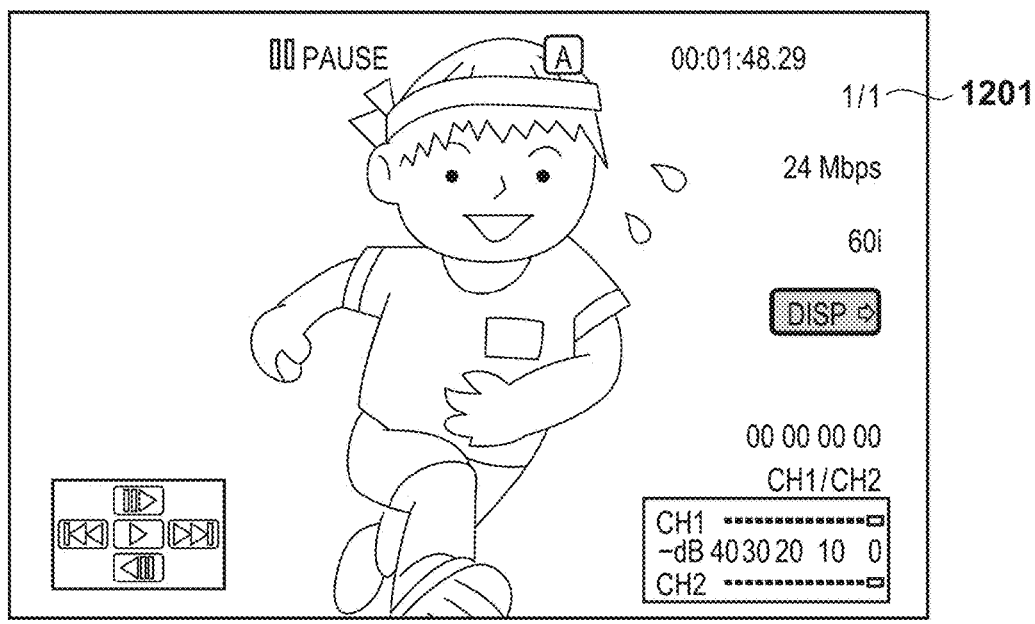
FIGS. 12A and 12B are views for representing playback screens.

The user performs a playback start operation by selecting a desired scene from the real index using the operation switch group 111. Here, when a playback start is instructed, the processing proceeds to step S504 from step S503, the microcomputer 107 starts a playback from the in point of the real scene selected, and in step S505, as illustrated in FIG. 12A, a playback screen is displayed. Numeral 1201 denotes a display portion of the number of scenes. The number of scenes display 1201 is displayed in a format of "a numeric value indicating what number scene it is"/"a total number of scenes of the real playlist". In the example of FIG. 11A and FIG. 11B, because in the real playlist there is only 1 scene recorded, the number of scenes display 1201 is "1/1".

In step S506, when a playback stopping operation is detected, the processing proceeds to step S510, and the microcomputer 107 performs playback stopping processing. Then, in step S524, the microcomputer 107 confirms whether the playback stopping request also serves as a switching request for switching to another operation mode. If there is no mode switching request, the microcomputer 107 performs other operation confirmation in step S525, and in a case where an operation has not been performed, a playback mode processing completion determination is performed in step S530. In a case where only the stopping of the playback is requested, the processing returns to step S501 in order to once again perform the index display.

Meanwhile, in a case where it is determined that there is no playback stopping request in step S506, the processing proceeds to step S507, and the microcomputer 107 confirms whether or not the scene during playback has reached the out point. If the scene has not reached the out point, the processing returns to step S506, and the microcomputer 107 continues with checking for playback stopping. In a case where it is determined that the out point has been reached, the microcomputer 107 proceeds to the next scene with an in point in the real scene in step S508. In a case where there is no next in point, and the current scene is the final scene, the processing proceeds to step S510 from step S509, and the microcomputer 107 performs playback stopping processing. In step S509, when it is determined that the current scene is not the final scene, the processing returns to step S504, and the microcomputer 107 starts a playback from the in point of the selected scene.

Figure 13:
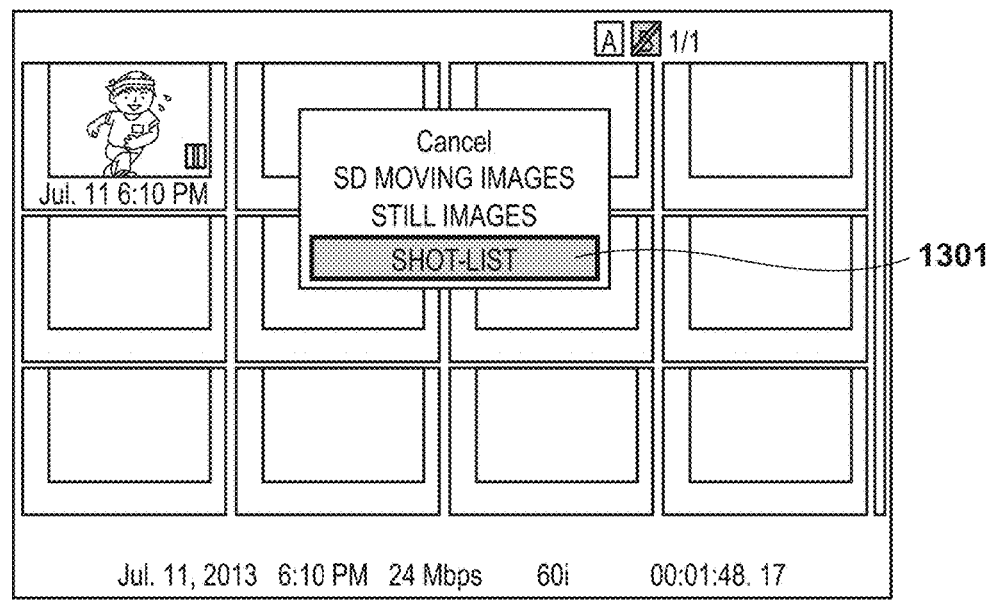
FIG. 13 is a view for representing an index switching screen.

In a case where playback start control is not instructed in step S503, the processing proceeds to step S511, and the microcomputer 107 confirms whether or not an index switching button is pressed. In a case where an index switching key is pressed, the processing proceeds to step S512, and the microcomputer 107 displays an index selection screen for switching the kind of index screen displayed. An example of the index selection screen displayed here is shown in FIG. 13. When a shot-list 1301 is selected in this screen, the image recording apparatus 100 transitions to the virtual index. With the virtual index, as explained in FIG. 11C, an index display of Ipictures in the vicinity of in points of scenes is recorded in the virtual playlist is perform. In a case where, in step S513, an instruction for transitioning to the virtual index (selection of the shot-list 1301) is detected, the processing proceeds to step S514, and the microcomputer 107 displays a virtual index screen. In a case where a transition to the virtual index is not selected, the processing proceeds to step S524.

Figure 12B:
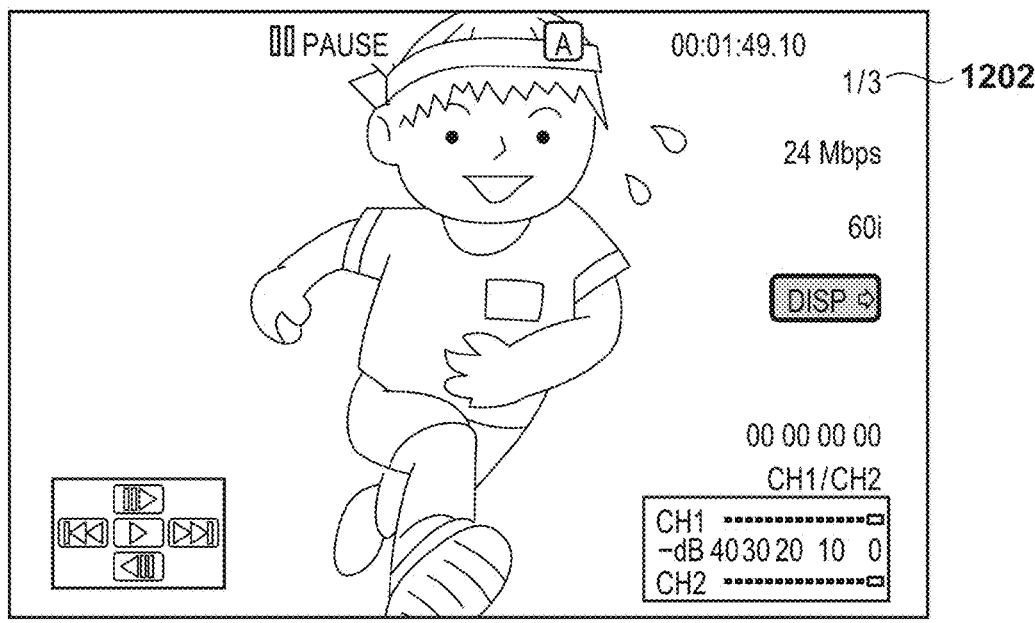

Meanwhile, in a case where it is determined in step S501 that continuous recording is not off (a case of playback mode processing is transitioned to from the continuous recording mode), the processing proceeds to step S514, and the microcomputer 107 performs a virtual index display in which virtual scenes are displayed in a list. When, in step S515, a scene is selected from the virtual index by a user operation on the operation switch group 111, and a playback start is instructed, the processing proceeds to step S518. In step S518, the microcomputer 107 starts a playback from the in point of the selected virtual scene, and displays the playback screen in step S531. In the playback here, playback is performed from the in points to the out points of the virtual scenes, and portions not between the in points and the out points from out of the real scene 1101 are not played back. In other words, intervals of portions of the moving image that is actually recorded is played back. An example of the playback screen is shown in FIG. 12B. Numeral 1202 denotes a display portion of the scene number in FIG. 12B. The scene number display 1202 is displayed in the format "a numeric value indicating what number the scene is within a single virtual playlist"/"the total number of scenes of the single virtual playlist". In other words, the scene number display 1202 is a display in units of the virtual playlist, and the content of other virtual playlists (other virtual playlists generated in past continuous recordings prior to turning on the continuous recording mode) are not considered. In the example of FIG. 11A and FIG. 11C, because there are three scenes recorded in the virtual playlist, the three scenes are consecutively played back. In the example of the figure, "1/3", which indicates that the first scene out of three scenes is being played back, is displayed.

When a playback stopping operation is detected during display of the playback screen, the processing proceeds to step S523 from step S519, and the microcomputer 107 performs playback stopping processing. Then, in step S524, the microcomputer 107 confirms whether the playback stopping request also serves as a switching request for switching to another operation mode. In a case where it is determined that the request does not also serve as a mode switching request, the processing proceeds to step S525, and the microcomputer 107 performs other operation confirmation processing. If another operation is not performed, the processing proceeds to step S530, and the microcomputer 107 performs a playback mode processing completion determination. In a case where only the stopping of the playback is requested, the processing returns to step S501 from step S530 in order to once again perform the index display.

Meanwhile, in a case where it is determined that there is no playback stopping request in step S519, the processing proceeds to step S520, and the microcomputer 107 confirms whether or not the scene during playback has reached the out point. If the out point has not been reached, checking for a playback stopping is continued in step S519. In a case where it is determined, in step S520, that the out point has been reached, the processing proceeds to step S521, and the microcomputer 107 makes the scene of the next in point in the virtual list to be the playback target. In a case where it is determined there is no next in point, and the current scene is the final scene in step S521, the processing proceeds to step S523, and the microcomputer 107 performs playback stopping processing. In a case where, in step S522, it is determined that the current scene is not the final scene, the processing returns to step S518, and the microcomputer 107 starts a playback from an in point of a scene selected as the playback target.

In a case where it is determined, in step S515, that a playback start is not instructed, the processing proceeds to step S516, and the microcomputer 107 confirms whether or not the index switching key is pressed. In a case where the index switching key is pressed, the processing proceeds to step S517, and the microcomputer 107 executes switching control for switching to the real index screen. After this, the processing proceeds to step S502, and the microcomputer 107 executes control for the above described real index display.

In step S524, the microcomputer 107 determines whether or not there was a switching request for switching to another operation mode. In a case where there is no switching request for switching to another operation mode, the microcomputer 107 determines (step S525) whether or not there was another operation, and if there was no other operation, performs (step S530) a playback mode processing completion determination. In a case where, in step S525, another operation is detected, the microcomputer 107 performs corresponding processing (step S526), and performs a playback mode processing completion determination (step S530). Also, in a case where, in step S524, it is determined that there is a switching request for switching to another operation mode, the processing proceeds to step S527. In step S527, the microcomputer 107 determines whether or not the request is a request for switching to the image capturing mode. In a case where the mode switching request is for switching into the image capturing mode, the processing proceeds to step S529, and the microcomputer 107 performs image capturing mode processing. In the image capturing mode processing, the processing proceeds to step S201 of FIG. 2A, and performs a determination of whether or not the continuous recording mode is on, and in accordance with the determination performs continuous recording mode processing or normal moving image recording processing. Here, because information as to whether or not the continuous recording mode is on is stored without being deleted during the playback mode, as a result, processing is performed in the same recording mode as before starting the playback processing. In other words, when the processing transitions to the playback mode from a state in which the continuous recording mode is on, and after that, the processing transitions to the recording mode, the continuous recording mode is entered. In the case of the present embodiment, switching is performed into either the image capturing mode, the playback mode, or the power OFF mode by the power switch 1706. As a result, in a case where it is determined that the request is not a mode switching request for switching into the image capturing mode in step S527, the processing proceeds to step S528, and power OFF mode processing is performed.

In step S530, the microcomputer 107 performs a playback mode processing completion determination. In this determination, it is determined whether or not the processing performed in the playback mode has completed, and in a case where the processing has yet to be completed, the processing proceeds to step S501. In a case where the processing has completed, the playback mode processing completes.

Figure 6:
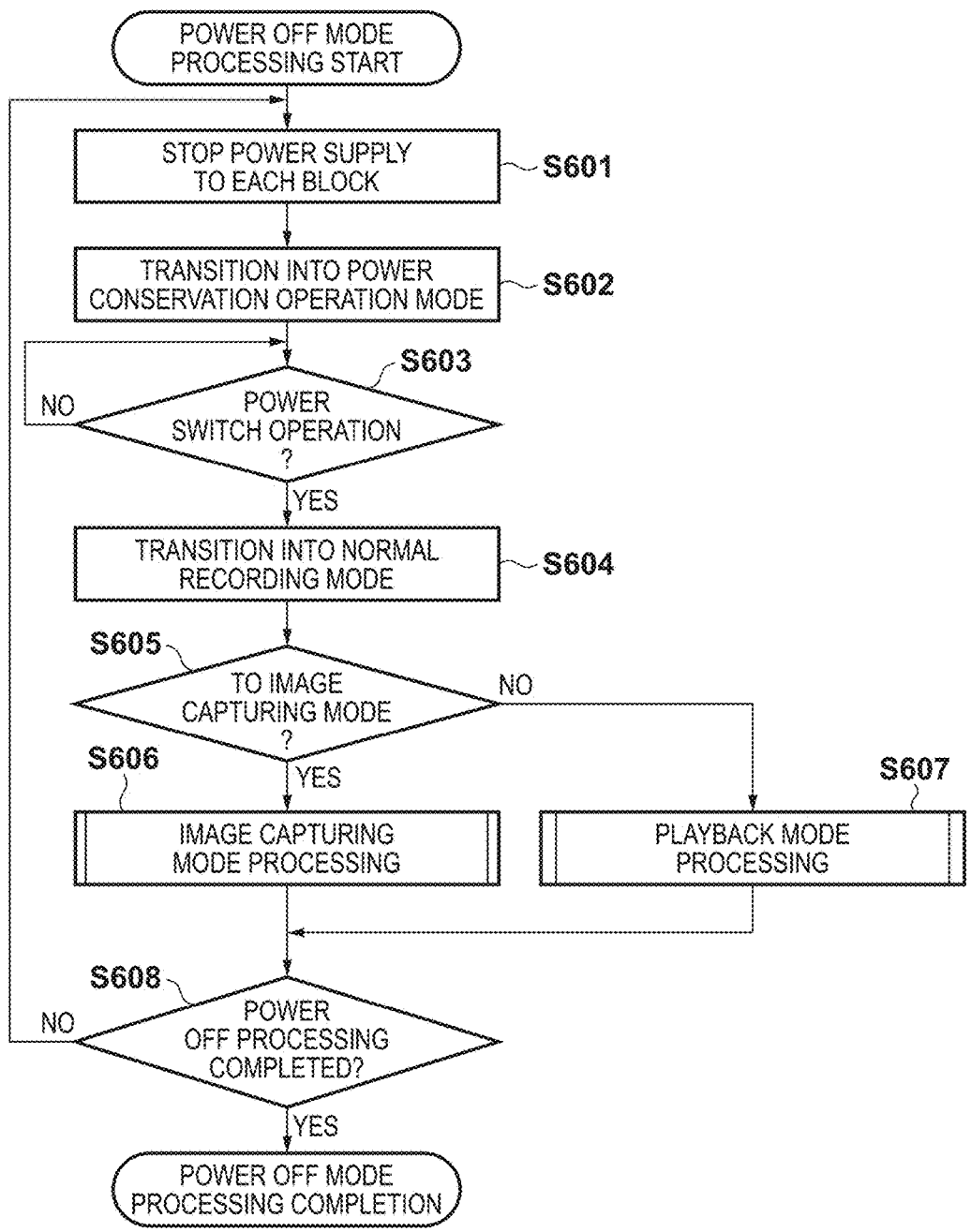
FIG. 6 is a flowchart for showing OFF processing of present embodiments.

Next, explanation will be given for power off mode processing executed in step S210, step S311, and step S528. FIG. 6 is a flowchart for showing a sequence of power off mode processing of the image recording apparatus 100 of the present embodiment.

When the power off mode processing is entered, the microcomputer 107 stops the electric power supply to each of the blocks within the image recording apparatus 100. Here, the blocks are the functional blocks as typified by the camera signal processing unit 103, the recording playback circuit 110, and the like, in FIG. 1. However, the microcomputer 107, the ROM 108, and the like, are kept in a state in which power continues to be supplied even after a power OFF so that power ON control can be later performed.

Next, in order to suppress the power of the microcomputer 107 itself, the microcomputer 107, in step S602, transitions into a power conservation operation mode. Here, by approaches such as reducing the frequency of a main clock of the microcomputer 107, for example, or limiting the power supply range of the microcomputer internal circuit, a power conservation operation is realized. In this embodiment, this power conservation operation state is assumed to be a powered off state. The image recording apparatus 100 stands by in the power conservation operation mode until control (operation) for turning on a power supply has been performed.

During the power conservation operation mode, the microcomputer 107 monitors the state of the power switch 1706 and determines whether or not the power ON control is performed. In a case where the power switch 1706 is not operated, the microcomputer 107 continues to be driven in the power conservation operation mode. In a case where an operation on the power switch 1706 is detected, the processing proceeds to step S604 from the step S603, and the microcomputer 107 causes the image recording apparatus 100 to transition into the normal recording mode. Then, in step S605, the microcomputer 107 detects the status of the power switch 1706, and determines which of the image capturing mode and the playback mode is instructed. In a case where it is determined that the image capturing mode is requested, the processing proceeds to step S606, and the microcomputer 107 executes the above described image capturing mode processing. Also, in a case where, in step S605, it is determined that the playback mode is requested, the processing proceeds to step S607, and the microcomputer 107 executes the above described playback mode processing. In step S608, if it is determined that the power OFF processing has completed, the power OFF processing completes.

Figure 14:
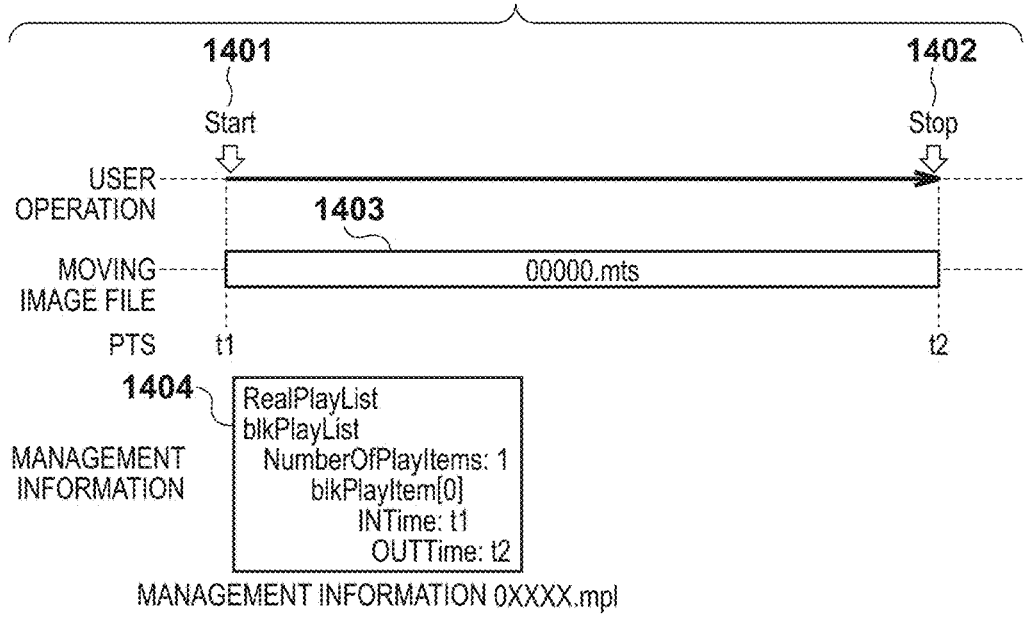
FIG. 14 is a view for representing a normal recording user operation, a moving image file, and management information.

FIG. 14 and FIG. 15 show a user operation, state of a stream, and a state of a playlist which is AVCHD management information when the normal recording and the continuous recording is performed as described above.

FIG. 14 is a view for representing a recording operation during normal recording. As shown in Start 1401, when the image recording apparatus 100 receives a recording instruction (step S401), a recording of a moving image file 1403 (the file name is 00000.mts) into the memory cards is started. Also, simultaneously, a scene is added to real playlist information 1404 loaded into the RAM 109 upon mounting. INTime of this scene is the PTS (t1) for the start of recording of the moving image file 1403.

When, after this, the image recording apparatus 100 receives (step S407) a recording stop instruction (Stop 1402), recording of the moving image file 1403 to the memory cards ends. Then, in the real playlist information 1404 loaded into the RAM 109, the end PTS (t2) of the moving image file 1403 is written as OUTTime, and the real playlist is written to the memory cards. In a real index playback, which is a playback of a real playlist, index display/playback operation is performed in accordance with a real playlist 1404. In an index screen display, an Ipicture in the vicinity of t1, which is the INTime of the real playlist, is displayed. Then, in real index playback, a playback display from t1, the INTime, to t2, the OUTTime, is performed.

FIG. 15 is a view for explaining a recording operation during continuous recording. From Start 1501, the real recording and the virtual recording are started, and recording of a moving image file 1509 (file name: 00000.mts) to the memory cards is started. Start 1501 is a point in time at which the image recording apparatus 100 receives an instruction for a continuous recording start from the menu, or a point in time when a recording instruction due to a Rec trigger (a first operation of the START/STOP button 1705 after transition to the continuous recording mode) is received (step S306, step S321).

Also, simultaneously, a scene is added to a real playlist 1507 loaded into the RAM 109 upon mounting. Also, a virtual play list 1508 is newly generated in the RAM 109, and a scene is added. By generating the virtual play list 1508 and the moving image file 1509 in the same folder, recording is performed with the virtual play list 1508 and the moving image file 1509 associated with each other. The INTime of the real playlist 1507 is the PTS (t1) at the start of the recording of the moving image file 1509. Also, the INTime of the virtual play list 1508 is the PTS (t2) of the Ipicture in the vicinity of the start (immediately after) of the recording of the moving image file 1509. After this, when a Rec trigger by an operator is detected (step S341), the virtual recording is stopped (Stop 1503), and the PTS (t3) of the Ipicture in the vicinity of Stop 1503 is recorded for the OUTTime of the virtual play list 1508.

In addition, after this, when once again a Rec trigger is detected (step S373), the virtual recording is started (Start 1504), and a scene is added newly to the virtual play list 1508. For the INTime of the newly added scene, the PTS (t4) of the Ipicture in the vicinity of Start 1504 is recorded. Then, when once again the Rec trigger is detected (step S341), the virtual recording is stopped (Stop 1505), and the PTS (t5) of the Ipicture in the vicinity of Stop 1505 is recorded for the OUTTime of the virtual play list 1508.

In addition, when once again a Rec trigger is pressed (step S373), the virtual recording is started once again (Start 1502), and a scene is added newly to the virtual play list 1508. For the INTime of the newly added scene, the PTS (t6) of the Ipicture in the vicinity of Start 1502 is recorded. After this, when a continuous recording stopping is selected from the menu, for example, (step S353), the virtual recording and the real recording are stopped (a menu stopping operation 1506). At this time, the PTS (t7) of the Ipicture in the vicinity of the menu stopping operation 1506 is recorded for the OUTTime of the virtual play list 1508. Then, the recording of the moving image file 1509 to the memory cards is stopped, and the PTS (t8) corresponding to the final frame is recorded as the OUTTime of the real playlist 1507. After this, the virtual play list 1508 and the real playlist 1507 in the RAM 109 are written out to the memory cards.

In a case where the virtual playlist is played back by a virtual index playback, index display/playback operation is performed in accordance with the virtual play list 1508. In the index screen display, Ipictures in the vicinity of the INTimes (t2, t4, and t6) of the virtual playlist are displayed (FIG. 11C). Then, in the virtual index reproduction, the scene from the INTime (t2) to the OUTTime (t3), the scene from the INTime (t4) to the OUTTime (t5), and the scene from the INTime (t6) to the OUTTime (t7) are played back and displayed.

Note, the microcomputer 107 executes the processing explained with reference to the flowcharts of FIG. 2A-FIG. 6, but limitation is not made to this. In other words, the control described above may be performed by a single piece of hardware, or control of the apparatus on the whole may be performed by sharing the processing between a plurality of pieces of hardware.

Although the present invention has been described in detail based on suitable embodiments, the present invention is not limited to these specific embodiments, and various forms within the spirit and scope of the invention are included in the present invention. Furthermore, the above described embodiments of the present invention are merely examples and it is possible to combine embodiments as appropriate.

Also, in the above described embodiments, explanation was given for and example of a case where the present invention is applied to an image recording apparatus such as a digital video camera, but the present invention is not limited to this example, and is also applicable to electronic apparatuses capable of moving image recording. In other words, the present invention is applicable to personal computers, PDAs, mobile telephone terminals, portable image viewers, printer apparatuses equipped with displays, digital photo frames, music players, game devices, an electronic book readers, and the like.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-173364, filed Aug. 23, 2013, Japanese Patent Application No. 2013-173365, filed Aug. 23, 2013, and Japanese Patent Application No. 2013-173778, filed Aug. 23, 2013, which are hereby incorporated by reference herein in their entirety.

What is claimed is:

1. An image recording apparatus comprising:
an imaging unit;
a particular operation member;
at least one processor; and
a memory having stored thereon instructions which, when executed by the at least one processor, cases the image recording apparatus to function as:
a setting unit configured to set one of a plurality of operation modes including a first recording mode and a second recording mode, wherein at least one function associated with operating the particular operation member is changed when the operation mode is changed by the setting unit between the first and second recording modes; and
a control unit configured to control so as to start or to stop, in a case where the first recording mode is set, in accordance with an operation on the particular operation member, a recording to a recording medium of a moving image captured by the imaging unit, and to control so as to record, in a case where the second recording mode is set, in accordance with an operation on the particular operation member, while continuing recording to the recording medium of a moving image captured by the imaging unit, information indicating a start of a scene which is a portion of the moving image being recorded, or information indicating an end of a scene which is a portion of the moving image being recorded,
wherein when a recording of a moving image is performed in the second recording mode, the recording of the moving image is started in accordance with an operation on the particular operation member but the recording of the moving image is not stopped in accordance with an operation on the particular operation member and the recording of the moving image is stopped in accordance with an operation on a second operation member other than the operation on the particular operation member.

2. The apparatus according to claim 1, wherein the information indicating the start of a scene, and the information indicating the end of a scene, in the moving image being recorded when an operation occurs that causes this information to be recorded respectively, is at least one of information of a time when the operation occurred, a time stamp for when the operation occurred, or information for identifying a frame for when the operation occurred.

3. The apparatus according to claim 1, wherein the particular operation member is a single operation key that a user is able to operate with a finger of a hand holding the image recording apparatus.

4. The apparatus according to claim 1, wherein the control unit, when a recording of a moving image is being performed in the second recording mode, controls to display a screen for stopping the recording of the moving image in response to a first operation and stop the recording of the moving image in response to a second operation on the second operation member while the screen is being displayed.

5. The apparatus according to claim 1, wherein the control unit, when a recording of a moving image is not performed in the second recording mode, controls so that a recording of a moving image is started and the information indicating the start of a scene is recorded in accordance with an operation on the particular operation member.

6. The apparatus according to claim 1, wherein the control unit, when a recording of a moving image is not performed in the second recording mode, controls so that a recording of a moving image is started and the information indicating the start of a scene is recorded in accordance with an instruction that instructs a start of a recording of a moving image.

7. The apparatus according to claim 1, wherein the control unit, in a case where, when a recording of a moving image is performed in the second recording mode, a condition under which a recording of a moving image to the recording medium cannot continue occurs, controls so that the recording of the moving image is stopped, and the information indicating the end of a scene is recorded.

8. The apparatus according to claim 7, wherein the condition under which the recording of the moving image cannot continue includes at least one of:
when a data amount recorded in the recording medium reaches an upper limit of a capacity of the recording medium,
when a lid of a slot for mounting the recording medium is open,
when a number of scenes recorded on the recording medium reaches an upper limit,
when a number of playlists of moving images recorded on the recording medium reaches an upper limit, or
when an operation mode is not a mode for performing a recording of a moving image.

9. The apparatus according to claim 1, wherein the control unit, in a case where an external recording, for performing a recording of a moving image on an external recording apparatus connected with the image recording apparatus, is performed in the first recording mode, controls so that the second recording mode cannot be set.

10. The apparatus according to claim 1, wherein the control unit, in a case where an external recording, for performing a recording of a moving image on an external recording apparatus connected with the image recording apparatus, is performed in the second recording mode, controls so that instructions are made for a recording start and stop of a moving image to the external recording apparatus in accordance with recording information indicating the start of a scene and information indicating the end of a scene.

11. The apparatus according to claim 10, wherein the control unit, in a case where the external recording is performed in the first recording mode, makes instructions for recording start and stop to the external recording apparatus in accordance with a start and a stop of recording the moving image to the recording medium.

12. An image recording method of an image recording apparatus having an imaging unit and a particular operation member, the method comprising:
setting one of a plurality of operation modes including a first recording mode and a second recording mode, wherein at least one function associated with operating the particular operation member is changed when the operation mode is changed by the setting unit between the first and second recording modes; and
controlling so as to start or to stop, in a case where the first recording mode is set, in accordance with an operation on the particular operation member, a recording to a recording medium of a moving image captured by the imaging unit, and to control so as to record, in a case where the second recording mode is set, in accordance with an operation on the particular operation member, while continuing recording to the recording medium of a moving image captured by the imaging unit, information indicating a start of a scene which is a portion of the moving image being recorded, or information indicating an end of a scene which is a portion of the moving image being recorded,
wherein when a recording of a moving image is performed in the second recording mode, the recording of the moving image is started in accordance with an operation on the particular operation member but the recording of the moving image is not stopped in accordance with an operation on the particular operation member and the recording of the moving image is stopped in accordance with an operation on a second operation member other than the operation on the particular operation member.

13. A non-transitory computer-readable storage medium storing a program for causing a computer to execute an image recording method of an image recording apparatus having an imaging unit and a particular operation member, the method comprising:
setting one of a plurality of operation modes including a first recording mode and a second recording mode, wherein at least one function associated with operating the particular operation member is changed when the operation mode is changed by the setting unit between the first and second recording modes; and
controlling so as to start or to stop, in a case where the first recording mode is set, in accordance with an operation on the particular operation member, a recording to a recording medium of a moving image captured by the imaging unit, and to control so as to record, in a case where the second recording mode is set, in accordance with an operation on the particular operation member, while continuing recording to the recording medium of a moving image captured by the imaging unit, information indicating a start of a scene which is a portion of the moving image being recorded, or information indicating an end of a scene which is a portion of the moving image being recorded,
wherein when a recording of a moving image is performed in the second recording mode, the recording of the moving image is started in accordance with an operation on the particular operation member but the recording of the moving image is not stopped in accordance with an operation on the particular operation member and the recording of the moving image is stopped in accordance with an operation on a second operation member other than the operation on the particular operation member.

* * * * *